(12) United States Patent
Sato

(10) Patent No.: US 10,312,537 B2
(45) Date of Patent: Jun. 4, 2019

(54) CONTROL METHOD FOR FUEL CELL SYSTEM AND FUEL CELL SYSTEM

(71) Applicant: NISSAN MOTOR CO., LTD., Yokohama-shi, Kanagawa (JP)

(72) Inventor: Masashi Sato, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/780,413

(22) PCT Filed: Sep. 29, 2016

(86) PCT No.: PCT/JP2016/078833
§ 371 (c)(1),
(2) Date: May 31, 2018

(87) PCT Pub. No.: WO2017/098783
PCT Pub. Date: Jun. 15, 2017

(65) Prior Publication Data
US 2018/0358636 A1    Dec. 13, 2018

(30) Foreign Application Priority Data
Dec. 10, 2015  (JP) .................................. 2015-241430

(51) Int. Cl.
*H01M 8/043* (2016.01)
*H01M 8/0438* (2016.01)
(Continued)

(52) U.S. Cl.
CPC ......... *H01M 8/0494* (2013.01); *H01M 8/043* (2016.02); *H01M 8/0432* (2013.01);
(Continued)

(58) Field of Classification Search
CPC ........... H01M 8/0494; H01M 8/04544; H01M 8/043; H01M 8/04492; H01M 8/04753
See application file for complete search history.

(56) References Cited

U.S. PATENT DOCUMENTS

2010/0291446 A1* 11/2010 Aso .................... B60L 11/1887
                                                                    429/429
2014/0120439 A1    5/2014 Makino et al.
(Continued)

FOREIGN PATENT DOCUMENTS

JP    2010-244937 A    10/2010
JP    2012-89523 A     5/2012
(Continued)

*Primary Examiner* — Jonathan G Jelsma
(74) *Attorney, Agent, or Firm* — Foley & Lardner LLP

(57) ABSTRACT

A control method for fuel cell system capable of executing an idle stop operation is provided, in which operation power generation of a fuel cell is selectively stopped according to a required output of a load and cathode gas is intermittently supplied to the fuel cell during an operation stop. An upper limit value and a lower limit value of an output voltage of the fuel cell during the idle stop operation is set, the cathode gas is intermittently supplied with the output voltage of the fuel cell set at a value between the upper limit value and the lower limit value, a wet/dry state of the fuel cell is detected, a wet/dry appropriate range in which the wet/dry state of the fuel cell during the idle stop operation is appropriate is set, and it is determined whether or not the detected wet/dry state of the fuel cell is within the set wet/dry appropriate range. If the wet/dry state of the fuel cell is determined to be outside the set wet/dry appropriate range, the output voltage of the fuel cell is reset, and the cathode gas is intermittently supplied with the output voltage of the fuel cell set at a value between the upper limit value and lower limit value of the reset output voltage.

15 Claims, 22 Drawing Sheets

(51) Int. Cl.
   *H01M 8/04492* (2016.01)
   *H01M 8/04828* (2016.01)
   *H01M 8/04858* (2016.01)
   *H01M 8/04119* (2016.01)
   *H01M 8/04537* (2016.01)
   *H01M 8/04746* (2016.01)
   *H01M 8/0432* (2016.01)
   *H01M 8/10* (2016.01)

(52) U.S. Cl.
   CPC ....... *H01M 8/0438* (2013.01); *H01M 8/0485* (2013.01); *H01M 8/04119* (2013.01); *H01M 8/04529* (2013.01); *H01M 8/04559* (2013.01); *H01M 8/04753* (2013.01); *H01M 8/04858* (2013.01); *H01M 8/0488* (2013.01); *H01M 8/10* (2013.01); *H01M 2250/20* (2013.01); *Y02T 90/32* (2013.01)

(56) References Cited

U.S. PATENT DOCUMENTS

| | | |
|---|---|---|
| 2015/0171444 A1 | 6/2015 | Tanaka |
| 2015/0188170 A1 | 7/2015 | Kagami |

FOREIGN PATENT DOCUMENTS

| | | |
|---|---|---|
| JP | 2013-161571 A | 8/2013 |
| JP | 2015-015193 A | 1/2015 |
| WO | WO 2012/176528 A1 | 12/2012 |
| WO | WO 2013/150651 A1 | 10/2013 |

\* cited by examiner

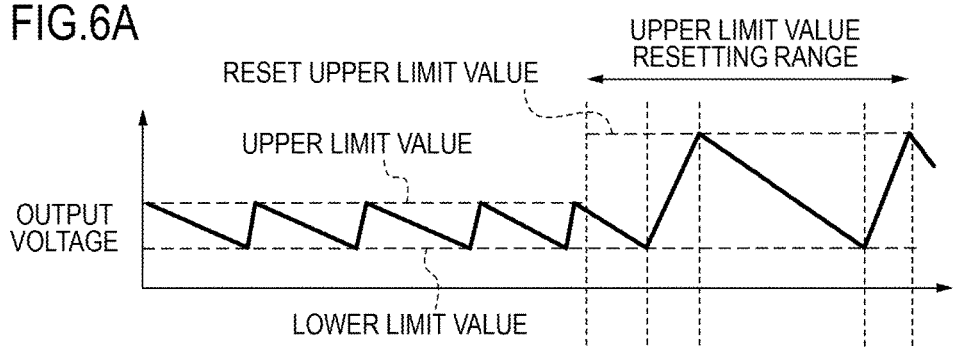
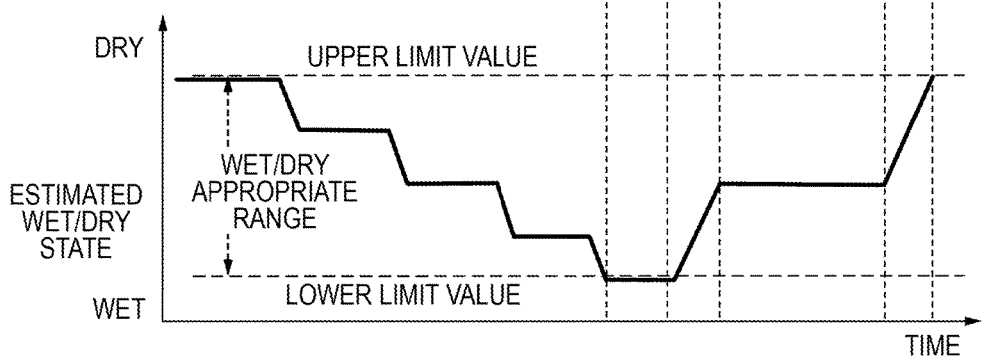

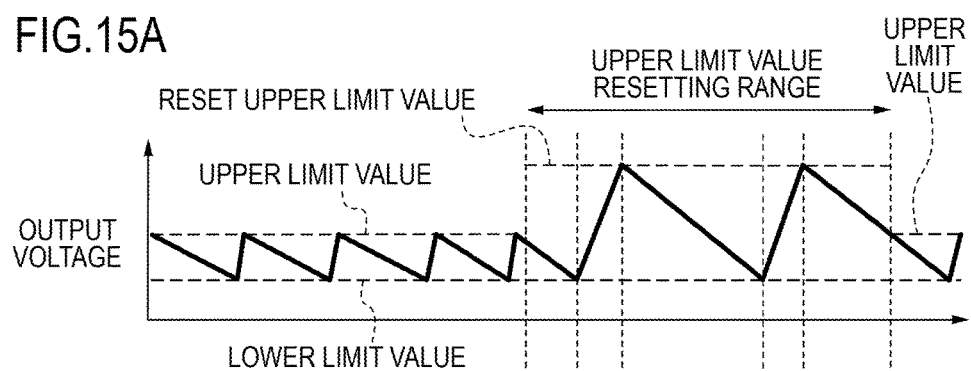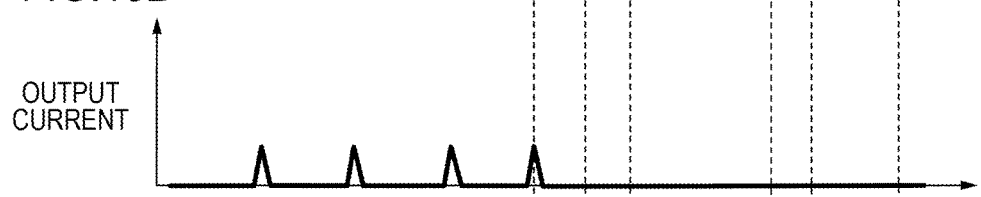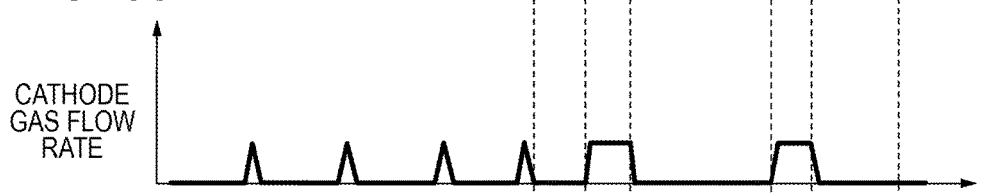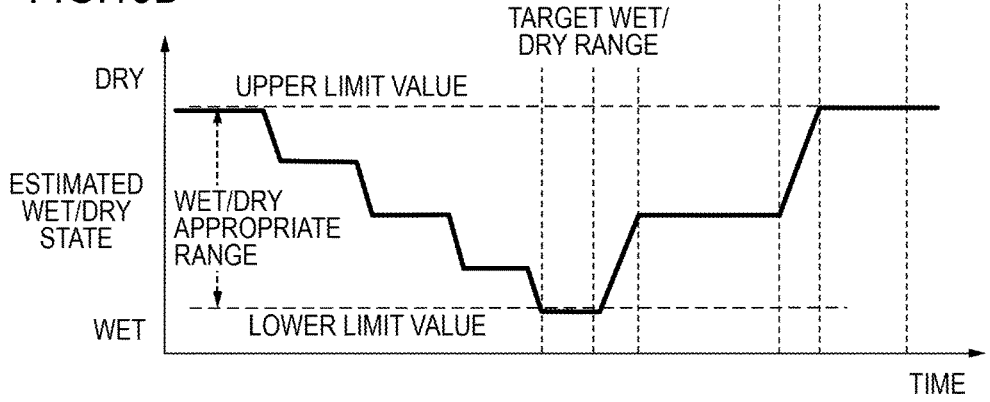

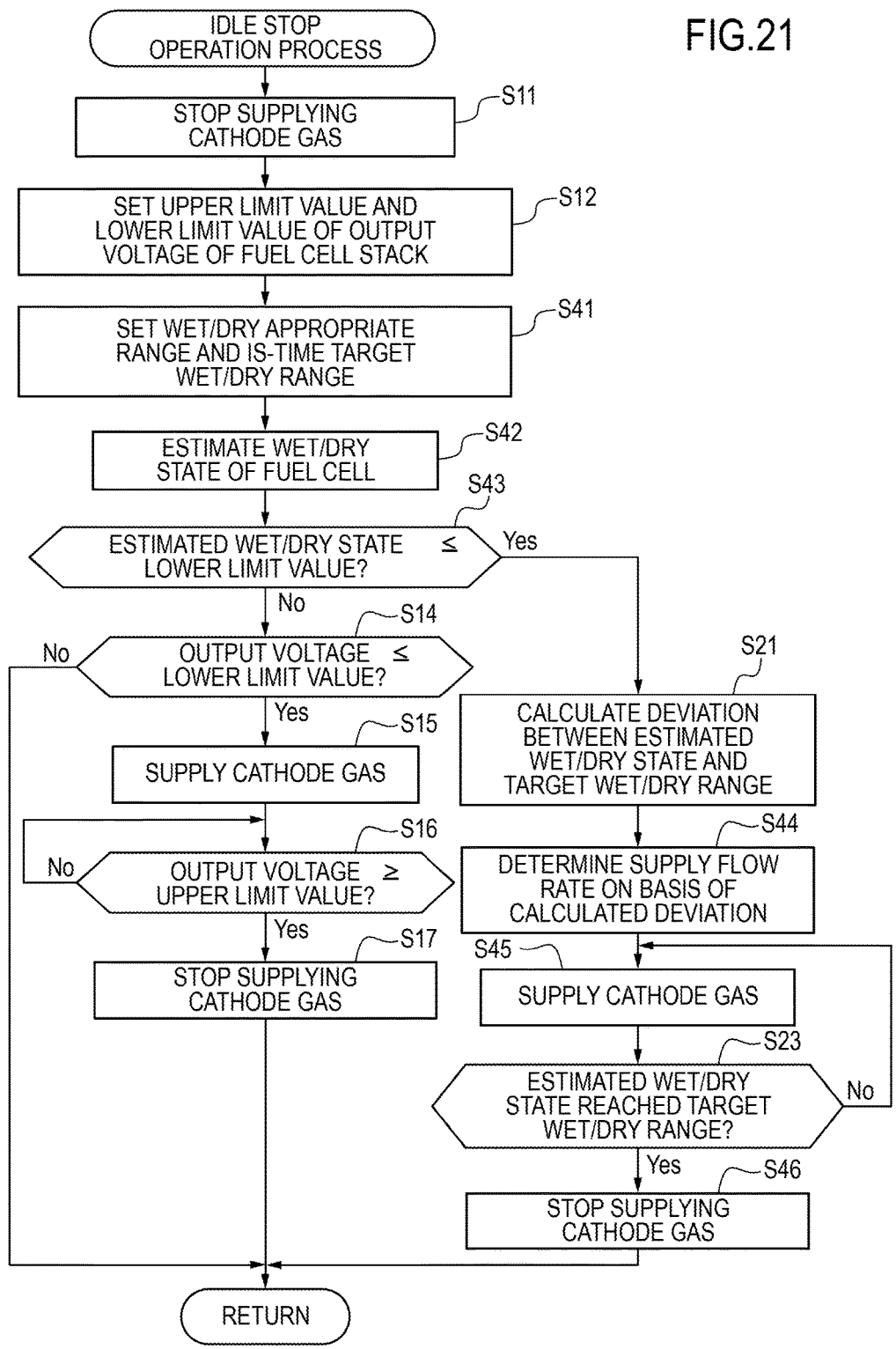

CONTROL METHOD FOR FUEL CELL SYSTEM AND FUEL CELL SYSTEM

TECHNICAL FIELD

The present invention relates to a control method for fuel cell system and a fuel cell system capable of executing an idle stop operation.

BACKGROUND ART

Conventionally, a fuel cell vehicle (electric vehicle) mounted with a fuel cell system has been proposed. In such a fuel cell system, anode gas (fuel gas) and cathode gas (oxidant gas) are supplied to fuel cells (fuel cell stack) to generate power by an electrochemical reaction, whereby the generated power is supplied to a drive motor in a subsequent stage.

In this fuel cell vehicle, the following control is executed without stopping the operation of the entire fuel cell system at a low load such as during low speed travel or during a temporary stop (including during downhill travel) and during an operation in which power generation efficiency of the fuel cells decreases. Specifically, in such a state, a control is executed to stop power generation by the fuel cells by stopping the operation of auxiliary machines used to drive the fuel cell system such as a compressor for cathode gas directly related to power generation, set the fuel cells in an idle stop state, and drive the motor by power supply only from a secondary battery.

JP2012-89523A discloses a fuel cell system of an anode gas circulation type configured such that air (cathode gas) is intermittently supplied during an idle stop operation (idle stop state), thereby causing an output voltage or cell voltage of a fuel cell stack to pulsate within a predetermined range.

In such a fuel cell system, residual anode gas leaking from anode gas flow passages in the fuel cell stack and cathode gas in cathode gas flow passages react by the intermittent supply of the cathode gas during the idle stop operation, thereby preventing an oxygen concentration in the cathode gas flow passages from decreasing. In this way, a trouble during a return from the idle stop state to a normal power generation state can be prevented.

Further, by providing an upper limit to the output voltage or cell voltage during the idle stop operation, the deterioration of electrolyte membranes in the fuel cells can be prevented from advancing by suppressing an increase of the output voltage of the fuel cell stack caused by excessive supply of the cathode gas.

SUMMARY OF INVENTION

However, in the above conventional fuel cell system, the cathode gas is intermittently supplied to the fuel cell stack during the idle stop operation, but there has been a problem that a wet/dry state of the electrolyte membranes in the fuel cells is not precisely grasped and controlled.

The present invention was developed, focusing on such a problem, and aims to provide a control method for fuel cell system and a fuel cell system capable of properly controlling a wet/dry state in a fuel cell during an idle stop operation and stabilizing an output of the fuel cell during a return from the idle stop operation.

According to one aspect of the present invention, a control method for fuel cell system is a method of being capable of executing an idle stop operation, in which operation power generation of a fuel cell is selectively stopped according to a required output of a load and cathode gas is intermittently supplied to the fuel cell during an operation stop. The method of this aspect including a step of setting an upper limit value and a lower limit value of an output voltage of the fuel cell during the idle stop operation, a step of intermittently supplying the cathode gas with the output voltage of the fuel cell set at a value between the upper limit value and the lower limit value, a step of detecting a wet/dry state of the fuel cell, and a step of setting a wet/dry appropriate range in which the wet/dry state of the fuel cell during the idle stop operation is appropriate. Furthermore, the method includes a step of determining whether or not the detected wet/dry state of the fuel cell is within the set wet/dry appropriate range, and the set upper limit value of the output voltage of the fuel cell is reset to increase if the detected wet/dry state of the fuel cell is determined to be outside the set wet/dry appropriate range. Here, the method intermittently supplies the cathode gas with the output voltage of the fuel cell set at a value between the reset upper limit value and lower limit value, in the cathode gas supplying step, if the upper limit of the output voltage of the fuel cell is reset to increase.

BRIEF DESCRIPTION OF DRAWINGS

FIG. 21 is a flow chart showing an example of an idle stop operation process executed by a controller in a sixth embodiment of the present invention, and FIG. 22 are time charts showing a state change of each physical quantity during the idle stop operation process in the sixth embodiment of the present invention.

DESCRIPTION OF EMBODIMENTS

Hereinafter, embodiments of the present invention are described with reference to the accompanying drawings.

First Embodiment

Figure 1:
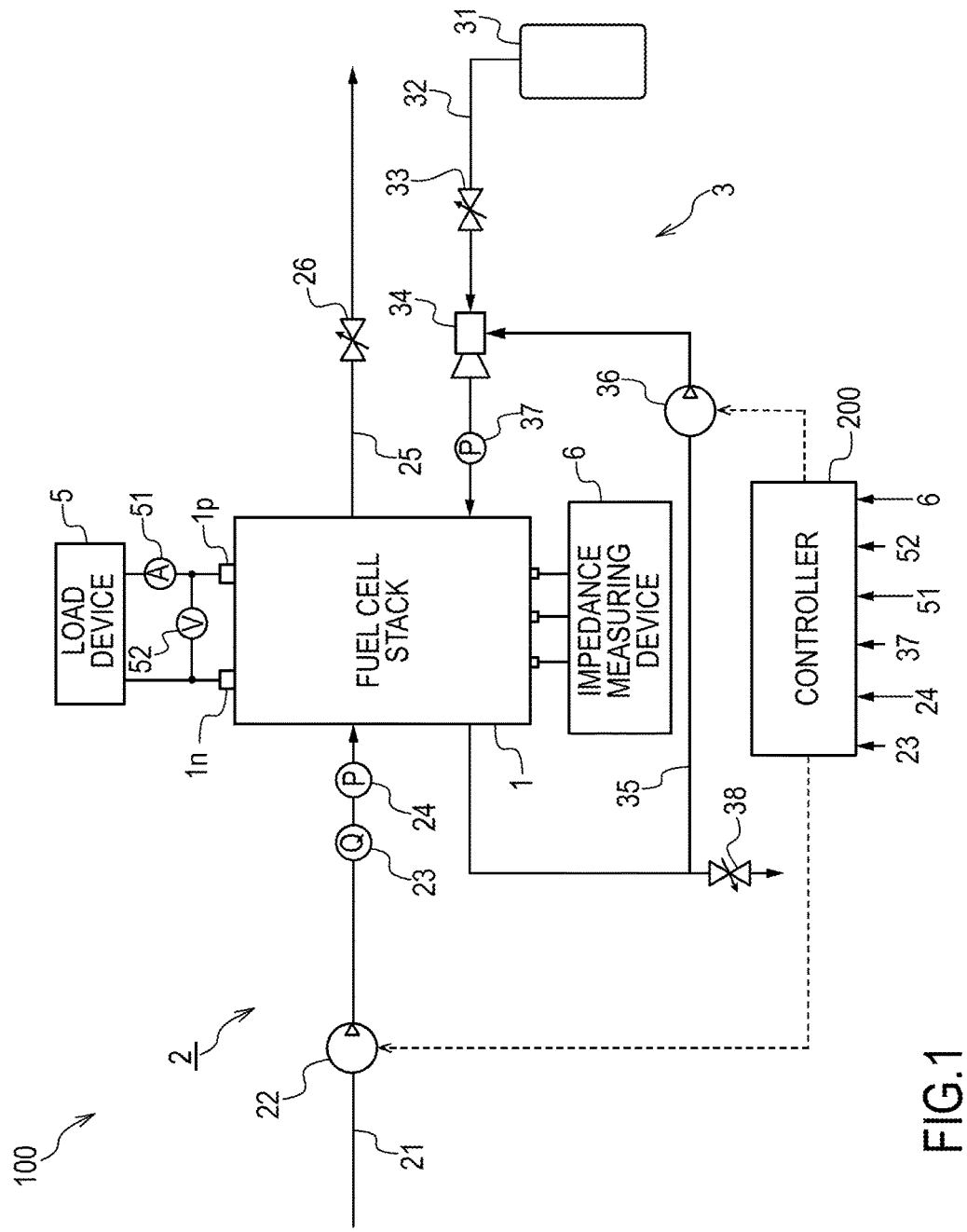
FIG. 1 is a diagram showing an example of an overall configuration of a fuel cell system in a first embodiment of the present invention.

FIG. 1 is a diagram showing an example of an overall configuration of a fuel cell system 100 in a first embodiment of the present invention. The fuel cell system 100 of the present embodiment uses fuel cells (fuel cell stack) as one of drive sources in an electric vehicle (fuel cell vehicle) with unillustrated high energy battery and drive motor.

The fuel cell system 100 constitutes a power supply system for causing a fuel cell stack 1 to generate power according to a request of an electrical load by supplying anode gas (hydrogen) and cathode gas (air) required for power generation to the fuel cell stack 1 from outside. The fuel cell system 100 of the present embodiment and a controller 200 thereof are specialized in controlling an output voltage of the fuel cell stack 1 and the supply of the cathode gas during an idle stop. Thus, the following description is centered on a control during the idle stop and the description of normal controls and known controls is omitted as appropriate.

As shown in FIG. 1, the fuel cell system 100 includes the fuel cell stack 1, a cathode gas supplying/discharging device 2, an anode gas supplying/discharging device 3, a load device 5, an impedance measuring device 6 and the controller 200.

The fuel cell stack 1 is a laminated battery in which several hundreds of fuel cells are laminated since power required from the drive motor serving as the load drive 5 is large. The fuel cell stack 1 is connected to the load device 5 and supplies power to the load device 5. The fuel cell stack 1 generates, for example, a direct-current voltage of several hundreds of V (volts).

Although not shown, the fuel cell stack 1 is configured such that an electrolyte membrane of each fuel cell is sandwiched by an anode electrode (fuel electrode) and a cathode electrode (oxidant electrode). During the operation of the fuel cell stack 1, hydrogen is ionized in the anode electrode to generate hydrogen ions and electrons. Further, in the cathode electrode, the hydrogen ions generated in the anode electrode and leaked toward a cathode gas flow passage, electrons circulating in the system and the supplied oxygen react to generate water.

The cathode gas supplying/discharging device 2 supplies the cathode gas (oxidant gas) to the fuel cell stack 1 and discharges cathode off-gas discharged from the fuel cell stack 1 to atmosphere. Specifically, the cathode gas supplying/discharging device 2 constitutes oxidant supply means for supplying oxidant (air) to the electrolyte membranes of the fuel cells.

As shown in FIG. 1, the cathode gas supplying/discharging device 2 includes a cathode gas supply passage 21, a compressor 22, a flow rate sensor 23, a pressure sensor 24, a cathode gas discharge passage 25 and a cathode pressure control valve 26.

The cathode gas supply passage 21 is a passage for supplying the cathode gas to the fuel cell stack 1. One end of the cathode gas supply passage 21 is open and the other end is connected to a cathode gas inlet hole of the fuel cell stack 1.

The compressor 22 is provided in the cathode gas supply passage 21. The compressor 22 takes in air containing oxygen through the open end of the cathode gas supply passage 21 and supplies that air as the cathode gas to the fuel cell stack 1. A rotation speed of the compressor 22 is controlled by the controller 200.

The flow rate sensor 23 is provided between the compressor 22 and the fuel cell stack 1 in the cathode gas supply passage 21. The flow rate sensor 23 detects a flow rate of the cathode gas to be supplied to the fuel cell stack 1. The flow rate of the cathode gas to be supplied to the fuel cell stack 1 is also merely referred to as a "cathode gas flow rate" below. Cathode gas flow rate data detected by this flow rate sensor 23 is output to the controller 200.

The pressure sensor 24 is provided between the compressor 22 and the fuel cell stack 1 in the cathode gas supply passage 21. The pressure sensor 24 detects a pressure of the cathode gas to be supplied to the fuel cell stack 1. Cathode gas pressure data detected by this pressure sensor 24 is output to the controller 200.

The cathode gas discharge passage 25 is a passage for discharging the cathode off-gas from the fuel cell stack 1. One end of the cathode gas discharge passage 22 is connected to a cathode gas outlet hole of the fuel cell stack 1 and the other end is open.

The cathode pressure control valve 26 is provided in the cathode gas discharge passage 25. An electromagnetic valve capable of changing an opening degree of the valve in a stepwise manner is, for example, used as the cathode pressure control valve 26. The cathode pressure control valve 26 is controlled to be open and closed by the controller 200. By this open/close control, the cathode gas pressure is adjusted to a desired pressure. As the opening degree of the cathode pressure control valve 26 becomes larger, the cathode pressure control valve 26 is opened more and a discharge amount of the cathode off-gas increases. On the other hand, as the opening degree of the cathode pressure control valve 26 becomes smaller, the cathode pressure control valve 26 is closed more and the discharge amount of the cathode off-gas decreases.

The anode gas supplying/discharging device 3 is a device for supplying the anode gas (fuel gas) to the fuel cell stack 1 and circulating anode off-gas discharged from the fuel cell stack 1 to the fuel cell stack 1. Specifically, the anode gas supplying/discharging device 3 constitutes fuel supply means for supplying fuel (hydrogen) to the electrolyte membranes of the fuel cells.

As shown in FIG. 1, the anode gas supplying/discharging device 3 includes a high-pressure tank 31, an anode gas supply passage 32, an anode pressure control valve 33, an ejector 34, an anode gas circulation passage 35, an anode circulation pump 36, a pressure sensor 37 and a purge valve 38.

The high-pressure tank 31 stores the anode gas to be supplied to the fuel cell stack 1 in a high-pressure state.

The anode gas supply passage 32 is a passage for supplying the anode gas stored in the high-pressure tank 31 to the fuel cell stack 1. One end of the anode gas supply passage 32 is connected to the high-pressure tank 31 and the other end is connected to an anode gas inlet hole of the fuel cell stack 1.

The anode pressure control valve 33 is provided between the high-pressure tank 31 and the ejector 34 in the anode gas supply passage 32. An electromagnetic valve capable of changing an opening degree of the valve in a stepwise manner is, for example, used as the anode pressure control valve 33. The anode pressure control valve 33 is controlled to be open and closed by the controller 200. By this open/close control, a pressure of the anode gas to be supplied to the fuel cell stack 1 is adjusted.

The ejector 34 is provided between the anode pressure control valve 33 and the fuel cell stack 1 in the anode gas supply passage 32. The ejector 34 is a mechanical pump provided in a part of the anode gas supply passage 32 where the anode gas circulation passage 35 joins. By providing the ejector 34 in the anode gas supply passage 32, the anode off-gas can be circulated to the fuel cell stack 1 by a simple configuration.

The ejector 34 sucks the anode off-gas from the fuel cell stack 1 by accelerating a flow velocity of the anode gas supplied from the anode pressure control valve 33 to generate a negative pressure. The ejector 34 discharges the sucked anode off-gas to the fuel cell stack 1 together with the anode gas supplied from the anode pressure control valve 33.

Although not specifically shown, the ejector 34 is composed of a conical nozzle having an opening narrowed from the anode pressure control valve 33 toward the fuel cell stack 1 and a diffuser with a suction port for sucking the anode off-gas from the fuel cell stack 1. It should be noted that although the ejector 34 is used in a joined part of the anode gas supply passage 32 and the anode gas circulation passage 35 in the present embodiment, this joined part may be so configured that the anode gas circulation passage 35 is merely joined to the anode gas supply passage 32.

The anode gas circulation passage 35 is a passage for mixing the anode off-gas discharged from the fuel cell stack 1 and the anode gas being supplied from the high-pressure tank 31 to the fuel cell stack 1 via the anode pressure control valve 33 and circulating mixture gas in the anode gas supply passage 32. One end of the anode gas circulation passage 35 is connected to an anode gas output hole of the fuel cell stack 1 and the other end is connected to the suction port of the ejector 34.

The anode circulation pump 36 is provided in the anode gas circulation passage 35. The anode circulation pump 36 circulates the anode off-gas to the fuel cell stack 1 via the ejector 34. A rotation speed of the anode circulation pump 36 is controlled by the controller 200. In this way, a flow rate of the anode gas (and anode off-gas) circulating to the fuel cell stack 1 is adjusted. A flow rate of the anode gas circulating to the fuel cell stack 1 is referred to as an "anode gas circulation flow rate" below.

Here, the controller 200 estimates (calculates) the anode gas circulation flow rate as a flow rate in a standard state on the basis of the number of revolutions per unit time of the anode circulation pump 36, a temperature in the fuel cell stack 1 to be described later (or ambient temperature of the anode gas supplying/discharging device 3 detected by an unillustrated temperature sensor) and a pressure of the anode gas in the anode gas circulation passage 35 detected by the pressure sensor 37 to be described later.

The pressure sensor 37 is provided between the ejector 34 and the fuel cell stack 1 in the anode gas supply passage 32. The pressure sensor 37 detects the pressure of the anode gas in an anode gas circulation system. Anode gas pressure data detected by this pressure sensor 37 is output to the controller 200.

The purge valve 38 is provided in an anode gas discharge passage branched from the anode gas circulation passage 35. The purge valve 38 discharges impurities contained in the anode off-gas to outside. The impurities mean nitrogen gas in the cathode gas permeated from cathode gas flow passages (not shown) of the fuel cells in the fuel cell stack 1 through the electrolyte membranes, water generated by the electrochemical reaction of the anode gas and the cathode gas according to power generation (generated water) and the like. An opening degree and an opening/closing frequency of the purge valve 38 are controlled by the controller 200.

It should be noted that, although not shown, the anode gas discharge passage joins the cathode gas discharge passage 25 on a downstream side of the cathode pressure control valve 26. This causes the anode off-gas discharged from the purge valve 38 to be mixed with the cathode off-gas in the cathode gas discharge passage 25. In this way, a hydrogen concentration in the mixture gas can be controlled to or below an allowable discharge concentration (4%).

The load device 5 is driven by receiving generated power supplied from the fuel cell stack 1. The load device 5 is constituted, for example, by a drive motor (electric motor) for driving the vehicle, some of auxiliary machines for assisting the power generation of the fuel cell stack 1, a control unit for controlling the drive motor or the like. Examples of the auxiliary machines for the fuel cell stack 1 include the compressor 22, the anode circulation pump 36 and an unillustrated cooling water pump. It should be noted that the cooling water pump is a pump for circulating cooling water for cooling the fuel cell stack 1.

Further, the load device 5 may include a DC/DC converter for stepping up and down an output voltage of the fuel cell stack 1 on an output side of the fuel cell stack 1 and a drive inverter for converting direct-current power into alternating-current power between the DC/DC converter and the drive motor. In this case, a high-voltage battery may be provided electrically in parallel with the fuel cell stack 1 with respect to the drive motor. Further, the load device 5 may be configured to connect some of the auxiliary machines to a power line between the DC/DC converter and the high-voltage battery. It should be noted that a control unit (not shown) for controlling the load device 5 outputs power required to the fuel cell stack 1 to the controller 200. For example, the required power of the load device 5 increases as an accelerator pedal provided in the vehicle is depressed more.

A current sensor 51 and a voltage sensor 52 are arranged in a power line between the load device 5 and the fuel cell stack 1.

The current sensor 51 is connected to the power line between a positive electrode terminal 1p of the fuel cell stack 1 and the load device 5. The current sensor 51 detects a current output from the fuel cell stack 1 to the load device 5 as an output current of the fuel cell stack 1. Stack output current data detected by the current sensor 51 is output to the controller 200.

The voltage sensor 52 is connected between the positive electrode terminal 1p and a negative electrode terminal 1n of the fuel cell stack 1. The voltage sensor 52 detects an inter-terminal voltage, which is a potential difference between the positive electrode terminal 1p and the negative electrode terminal 1n of the fuel cell stack 1. The inter-terminal voltage of the fuel cell stack 1 is referred to as a "stack output voltage" or merely an "output voltage" below. Stack output voltage data detected by the voltage sensor 52 is output to the controller 200.

The impedance measuring device 6 is a device for measuring an internal impedance of the fuel cell stack 1. The internal impedance of the fuel cell stack 1 is correlated with the wet/dry state of the electrolyte membranes. Thus, by measuring the internal impedance of the fuel cell stack 1, the wet/dry state (degree of wetness) of the electrolyte membranes can be detected (estimated) on the basis of that measurement result.

Generally, the internal impedance of the fuel cell stack 1 increases as the water content of the electrolyte membranes decreases, i.e. as the electrolyte membranes become drier. On the other hand, the internal impedance of the fuel cell stack 1 decreases as the water content of the electrolyte membranes increases, i.e. as the electrolyte membranes become wetter. Thus, the internal impedance of the fuel cell stack 1 is used as a parameter indicating the wet/dry state of the electrolyte membranes.

Figure 2:
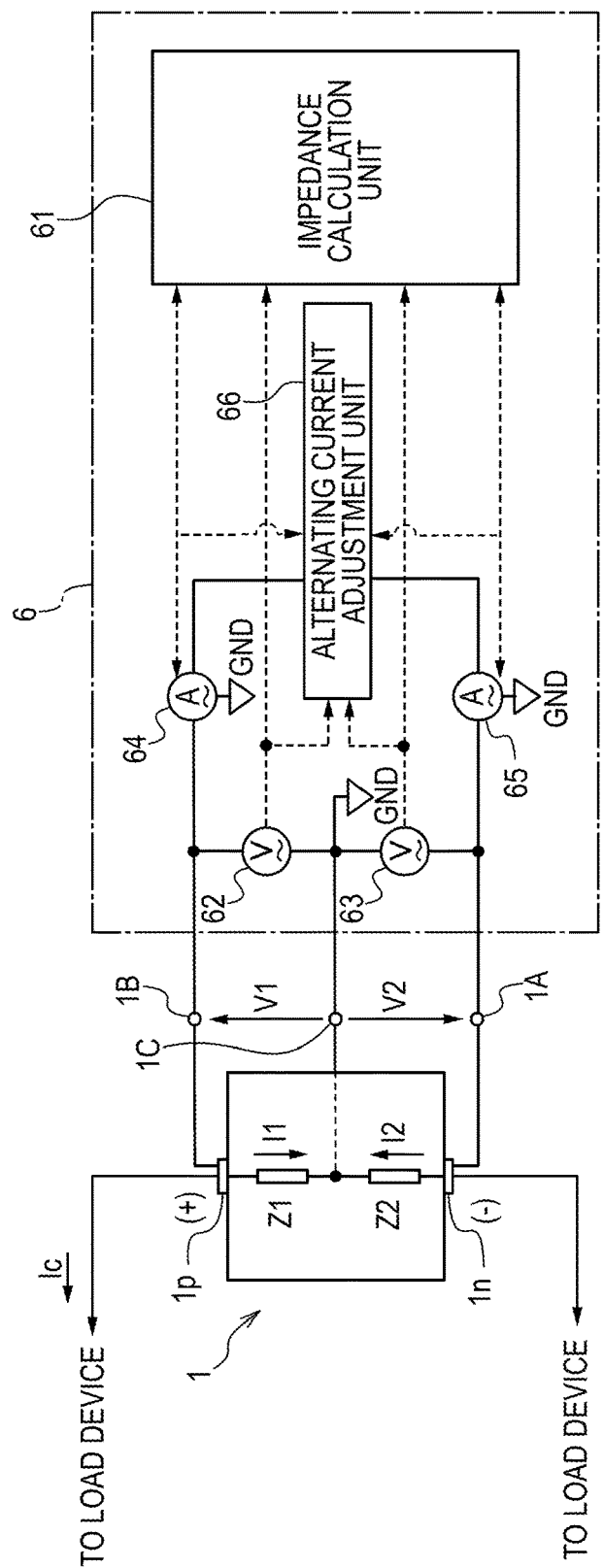
FIG. 2 is a circuit diagram of an impedance measuring device for measuring an internal impedance of a fuel cell stack shown in FIG. 1.

Here, the configuration of the impedance measuring device 6 is described. FIG. 2 is a circuit diagram of the impedance measuring device 6 for measuring the internal impedance of the fuel cell stack 1 shown in FIG. 1. Connection indicated by solid line indicates electrical connection and connection indicated by broken line (dashed line) indicates electrical signal connection.

This impedance measuring device 6 is connected to a terminal 1B extending from the positive electrode terminal (cathode-electrode side terminal) 1p of the fuel cell stack 1, a terminal 1A extending from the negative electrode terminal (anode-electrode side terminal) 1n and an intermediate terminal 1C. It should be noted that a part connected to the intermediate terminal 1C is grounded as shown.

As shown in FIG. 2, the impedance measuring device 6 includes a positive-electrode side voltage sensor 62, a negative-electrode side voltage sensor 63, a positive-electrode side power supply unit 64, a negative-electrode side power supply unit 65, an alternating current adjustment unit 66 and an impedance calculation unit 61.

The positive-electrode side voltage sensor 62 is connected to the terminal 1B and the intermediate terminal 1C, measures a positive-electrode side alternating-current potential difference V1 of the terminal 1B with respect to the intermediate terminal 1C at a predetermined frequency and outputs that measurement result to the alternating current adjustment unit 66 and the impedance calculation unit 61. The negative-electrode side voltage sensor 63 is connected to the intermediate terminal 1C and the terminal 1A, measures a negative-electrode side alternating-current potential difference V2 of the terminal 1A with respect to the intermediate terminal 1C at the predetermined frequency and outputs that measurement result to the alternating current adjustment unit 66 and the impedance calculation unit 61.

The positive-electrode side power supply unit 64 is realized, for example, by a voltage-current conversion circuit by an unillustrated operational amplifier, and controlled by the alternating current adjustment unit 66 so that an alternating current I1 of the predetermined frequency flows into a closed circuit composed of the terminal 1B and the intermediate terminal 1C. Further, the negative-electrode side power supply unit 65 is realized, for example, by a voltage-current conversion circuit by an unillustrated operational amplifier (OP amplifier), and controlled by the alternating current adjustment unit 66 so that an alternating current I2 of the predetermined frequency flows into a closed circuit composed of the terminal 1A and the intermediate terminal 1C.

Here, the "predetermined frequency" is a frequency suitable for detecting the impedance of the electrolyte membranes. This predetermined frequency is referred to as an "electrolyte membrane response frequency" below.

The alternating current adjustment unit 66 is realized, for example, by an unillustrated PI control circuit and generates command signals to the positive-electrode side power supply unit 64 and the negative-electrode side power supply unit 65 so that the alternating currents I1, I2 as described above flow into the respective closed circuits. By increasing or decreasing outputs of the positive-electrode side power supply unit 64 and the negative-electrode side power supply unit 65 according to the thus generated command signals, the alternating-current potential differences V1 and V2 between the terminals are both controlled to a predetermined level (predetermined value). In this way, the alternating-current potential differences V1 and V2 become equal.

The impedance calculation unit 61 includes hardware such as unillustrated AD converter, microchip and the like and a software configuration such as a program for calculating an impedance. The impedance calculation unit 61 converts the alternating-current voltages (V1, V2) and the alternating currents (I1, I2) input from each component 62, 63, 64, 65 into digital numeric signals by the AD converter and performs a processing for impedance measurement.

Specifically, the impedance calculation unit 61 calculates a first impedance Z1 from the intermediate terminal 1C to the terminal 1B by dividing an amplitude of the positive-electrode side alternating-current potential difference V1 by that of the alternating current I1. Further, the impedance calculation unit 61 calculates a second impedance Z2 from the intermediate terminal 1C to the terminal 1A by dividing an amplitude of the negative-electrode side alternating-current potential difference V2 by that of the alternating current I2. Furthermore, the impedance calculation unit 61 calculates an internal impedance Z of the fuel cell stack 1 by adding the first and second impedances Z1 and Z2.

It should be noted that, if the DC/DC converter is provided as the load device 5, the controller 200 may first cause the DC/DC converter to step up the output voltage of the fuel cell stack 1 in measuring the internal impedance of the fuel cell stack 1. This causes the impedance to increase when the side of the fuel cell stack 1 is viewed from the drive inverter, thereby achieving an effect of not adversely affecting the impedance measurement even if there is a load variation.

In FIG. 2, the terminals 1B and 1A are shown to be directly connected to each output terminal of the fuel cell stack 1 for the sake of illustration. However, in the fuel cell system 100 of the present embodiment, there is no limitation to such connection and the terminals 1B and 1A may be connected to a positive electrode terminal of the fuel cell on the most positive-electrode side and a negative electrode terminal of the fuel cell on the most negative-electrode side, out of a plurality of fuel cells laminated in the fuel cell stack 1.

Further, in the present embodiment, the impedance calculation unit 61 is configured to calculate the internal impedance of the fuel cell stack 1 by executing a program stored in advance in an unillustrated memory by the hardware such as the microchip. However, the impedance calculation unit 61 is not limited to such a configuration. For example, the impedance calculation unit 61 may be realized by an analog computation circuit using an analog computation IC. By using the analog computation circuit, a temporally continuous impedance change can be output.

Here, in the present embodiment, the impedance measuring device 6 uses alternating-current signals constituted by sine wave signals as the alternating currents and alternating-current voltages. However, these alternating-current signals are not limited to sine wave signals and may be rectangular wave signals, triangular wave signals, sawtooth signals or the like.

The internal impedance measured on the basis of the electrolyte membrane response frequency is referred to as a HFR (High Frequency Resistance) below. The impedance measuring device 6 outputs the calculated HFR to the controller 200.

Referring back to FIG. 1, although not shown, the controller 200 is configured by a microcomputer including a central processing unit (CPU), a read-only memory (ROM), a random access memory (RAM) and an input/output interface (I/O interface).

An output signal of each of the flow rate sensor 23, the pressure sensor 24, the pressure sensor 37, the current sensor 51, the voltage sensor 52 and the impedance measuring device 6 and the required power of the load device 5 are input to the controller 200. These signals are used as parameters relating to an operating state of the fuel cell system 100.

The controller 200 controls the flow rate and pressure of the cathode gas to be supplied to the fuel cell stack 1 by controlling the compressor 22 and the cathode pressure control valve 26 according to the operating state of the fuel cell system 100. Further, the controller 200 controls the flow rate and pressure of the anode gas to be supplied to the fuel cell stack 1 by controlling the anode pressure control valve 33 and the anode circulation pump 36.

It should be noted that, although not shown, the fuel cell system 100 includes a stack cooling device for cooling the fuel cell stack 1. The controller 200 controls the temperature (cooling water temperature or stack temperature) of each fuel cell in the fuel cell stack 1 and the temperature of the cathode gas supplied to the fuel cell stack 1 by controlling a cooling water pump, a three-way valve, a radiator fan and the like in the stack cooling device according to the operating state of the fuel cell system 100.

For example, the controller 200 calculates a target flow rate and a target pressure of the cathode gas, a target flow rate and a target pressure of the anode gas and a target temperature of the cooling water (target cooling water temperature) on the basis of the required power of the load device 5. The controller 200 controls the rotation speed of the compressor 22 and the opening degree of the cathode pressure control valve 26 on the basis of the target flow rate and target pressure of the cathode gas. Further, the controller 200 controls the rotation speed of the anode circulation pump 36 and the opening degree of the anode pressure control valve 33 on the basis of the target flow rate and target pressure of the anode gas.

In such a fuel cell system 100, if the degree of wetness (water content) of each electrolyte membrane becomes excessively high or excessively low, the power generation performance of the fuel cell system 100 decreases. To cause the fuel cell stack 1 to efficiently generate power, it is important to maintain the electrolyte membranes of the fuel cell stack 1 at a suitable degree of wetness (wet/dry state). To that end, the controller 200 manipulates the wet/dry state of the fuel cell stack 1 so that the degree of wetness of the fuel cell stack 1 is suitable for power generation within a range where the required power of the load device 5 can be ensured.

In the present embodiment, a control during an idle stop (may be abbreviated as "IS" below) operation of the fuel cell system 100 is particularly described in detail. In this specification, a transition of the wet/dry state of the fuel cell stack 1 (wet/dry state of the electrolyte membranes of the fuel cells) to a dry side, i.e. a reduction of excess moisture of the electrolyte membranes is called a "dry operation". Further, a transition of the wet/dry state of the fuel cell stack 1 to a wet side, i.e. an increase of moisture of the electrolyte membranes is called a "wet operation".

In the present embodiment, for a wet/dry control of manipulating the wet/dry state of the fuel cell stack 1 during the idle stop operation, the controller 200 mainly controls the cathode gas flow rate. A specific idle stop operation control is described later.

Figure 3:
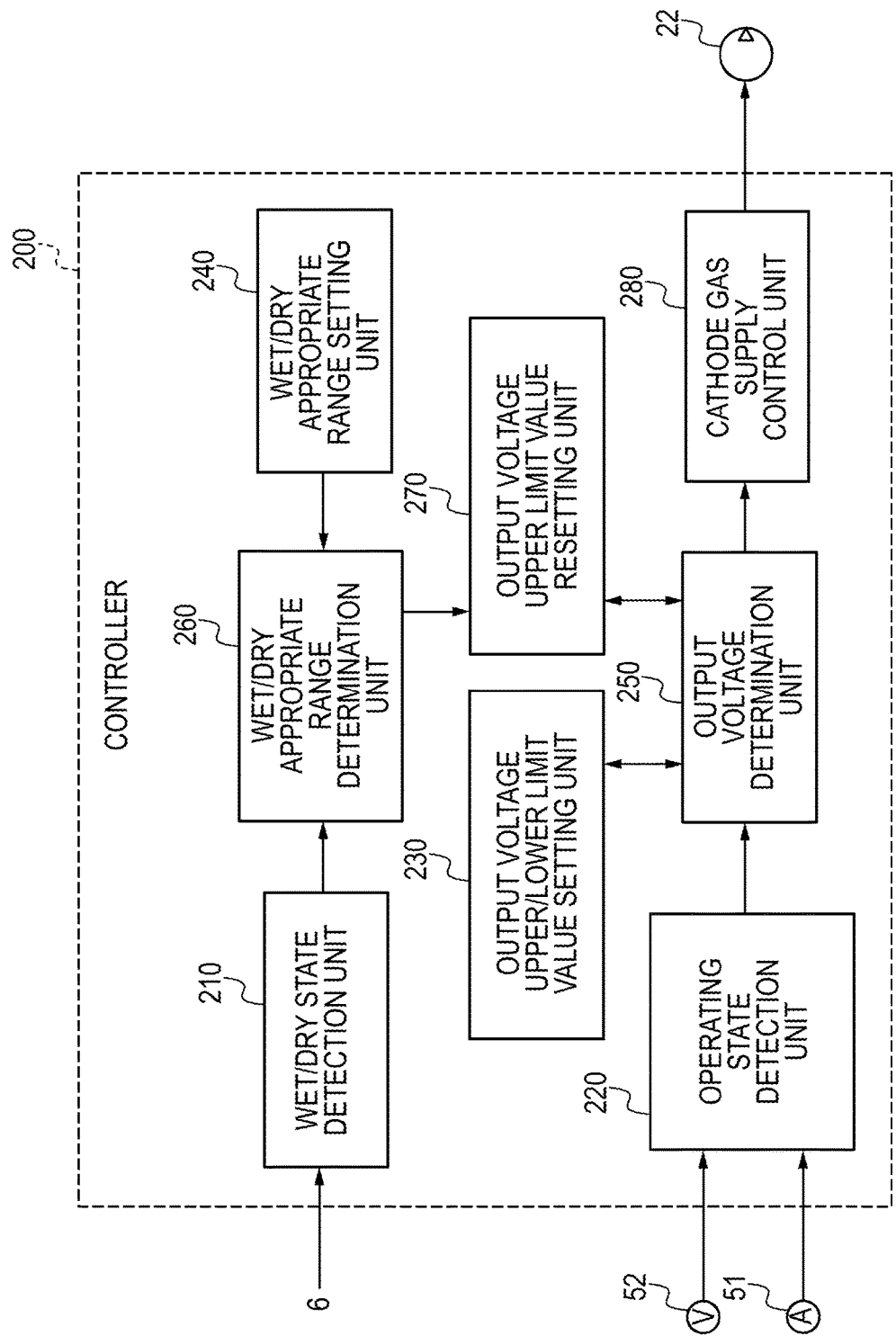
FIG. 3 is a block diagram showing an example of a functional configuration of a controller for controlling the fuel cell system in the embodiment.

Next, control functions of the controller 200 for controlling the fuel cell system 100 of the present embodiment are described. FIG. 3 is a block diagram showing an example of a functional configuration of the controller 200 for controlling the fuel cell system 100 in the present embodiment. It should be noted that functions relating to the present invention are mainly shown in the functional block diagram of the controller 200 shown in FIG. 3 and some of functions relating to a normal operation control and other controls of the fuel cell system 100 are omitted.

As shown in FIG. 3, the controller 200 of the present embodiment includes a wet/dry state detection unit 210, an operating state detection unit 220, an output voltage upper/lower limit value setting unit 230, a wet/dry appropriate range setting unit 240, an output voltage determination unit 250, a wet/dry appropriate range determination unit 260, an output voltage upper limit value resetting unit 270 and a cathode gas supply control unit 280.

The wet/dry state detection unit 210 detects the wet/dry state of the electrolyte membranes of the fuel cells in the fuel cell stack 1. The wet/dry state detection unit 210 particularly detects the wet/dry state of the electrolyte membranes during the idle stop operation of the fuel cell system 100. Specifically, the wet/dry state detection unit 210 obtains the HFR of the fuel cell stack 1 measured by the impedance measuring device 6. Then, the wet/dry state detection unit 210 refers to an impedance-degree of wetness map stored in advance in the unillustrated memory and detects the degree of wetness of the electrolyte membranes. The detected degree of wetness data is output to the wet/dry appropriate range determination unit 260. It should be noted that the HFR output from the impedance measuring device 6 is referred to as a "measured HFR" below. Further, the degree of wetness of the electrolyte membranes detected by the wet/dry state detection unit 210 is also referred to as a "detected wet/dry state".

In the present embodiment, the wet/dry state detection unit 210 is described to detect/calculate the wet/dry state of the electrolyte membranes of the fuel cells in the fuel cell stack 1 on the basis of the HFR of the fuel cell stack 1 measured by the impedance measuring device 6. However, the wet/dry state detection unit 210 may output the obtained HFR as it is to a subsequent stage and each unit in the subsequent stage may execute a control using that HFR. It should be noted that since the HFR is measured by the impedance measuring device 6 not contributing to the operation of the fuel cell system 100 in the present embodiment, the HFR of the fuel cell stack 1 can be continuously or constantly measured if necessary also during the idle stop operation of the fuel cell system 100.

The operating state detection unit 220 obtains the stack output current data and stack output voltage data of the fuel cell stack 1 detected by the current sensor 51 and the voltage sensor 52 and detects output power of the fuel cell stack 1 by multiplying the stack output current and the stack output voltage. In the present embodiment, the operating state detection unit 220 outputs the output voltage of the fuel cell stack 1 detected by the voltage sensor 52 to the output voltage determination unit 250. The output voltage of the fuel cell stack 1 obtained by the operating state detection unit 220 is also referred to as a "detected output voltage" below.

Further, the operating state detection unit 220 obtains the cathode gas flow rate data detected by the flow rate sensor 23 and the cathode gas pressure data detected by the pressure sensor 24 and detects an operating state of the cathode gas supplying/discharging device 2. Similarly, the operating state detection unit 220 obtains the anode gas pressure data detected by the pressure sensor 37 and detects an operating state of the anode gas supplying/discharging device 3 by estimating the anode gas circulation flow rate.

It should be noted that the operating state detection unit 220 also obtains various pieces of command value data calculated by unillustrated various calculation units in the controller 200. Various pieces of instruction data include at least rotation speed data of the compressor 22, opening degree data of the cathode pressure control valve 26, opening degree data of the anode pressure control valve 33 and rotation speed data of the anode circulation pump 36.

The output voltage upper/lower limit value setting unit 230 sets an upper limit value and a lower limit value of the output voltage of the fuel cell stack 1 during the idle stop operation. The upper and lower limit values of the output voltage set in this way are output to the wet/dry appropriate range setting unit 240 and the output voltage determination unit 250. In the present embodiment, as described later, the compressor 22 of the cathode gas supplying/discharging device 2 is intermittently operated if necessary during the idle stop operation, whereby the output voltage of the fuel cell stack 1 is controlled between the upper limit value and the lower limit value set in this way.

Here, how to set the upper and lower limit values of the output voltage is described. The "upper limit value" is set at a maximum output voltage at which the deterioration of the electrolyte membrane of each cell does not advance even if a cell voltage of each fuel cell constituting the fuel cell stack 1 increases due to the supply of the cathode gas to the cathode gas flow passages of the fuel cells.

Further, the "lower limit value" is set at an output voltage at which a response delay of power generation does not occur due to the lack of oxygen in the cathode gas flow passages and a minimum input voltage of the unillustrated drive motor can be ensured when the fuel cell stack 100 returns to a normal operation (normal power generation state) from the idle stop operation. The "upper limit value" and the "lower limit value" of the output voltage may be set in advance using a predetermined calculation model or on the basis of an experimental result.

The wet/dry appropriate range setting unit 240 sets a wet/dry appropriate range in which the wet/dry state of the electrolyte membranes of the fuel cells (wet/dry state of the fuel cell stack 1) during the idle stop operation is appropriate. In the present embodiment, this wet/dry appropriate range is set by providing an upper limit value and a lower limit value of a range which is obtained in advance by an experiment, simulation or the like and where the wet/dry state is appropriate. It should be noted that the upper and lower limit values of the wet/dry state may be set as upper and lower limit values of the measured HFR.

During the idle stop operation, every time the cathode gas is intermittently supplied, the wet/dry state transitions to a wet side due to an electrochemical reaction of oxygen in the supplied cathode gas and residual hydrogen and becomes wetter than during the normal operation. Thus, the lower limit value of the wet/dry state is set at a wet/dry state (HFR) in which the fuel cell stack 1 does not become excessively wet.

On the other hand, the upper limit value of the wet/dry state is, for example, set at a wet/dry state (HFR) in which a response delay of power generation of the fuel cell stack 1 does not occur and the electrolyte membranes of the fuel cells do not become excessively dry during a return of the fuel cell system 100 from the idle stop operation.

The output voltage determination unit 250 determines whether or not the output voltage is within a predetermined range on the basis of the detected output voltage of the fuel cell stack 1 obtained from the operating state detection unit 220 and the upper and lower limit values of the output voltage obtained from the output voltage upper/lower limit value setting unit 230. Specifically, the output voltage determination unit 250 determines whether or not the detected output voltage has dropped to or below the lower limit value of the output voltage and determines whether or not the detected output voltage has increased to or above the upper limit value of the output voltage. These determination results are output to the cathode gas supply control unit 280.

The wet/dry appropriate range determination unit 260 determines whether or not the wet/dry state (detected wet/dry state) of the fuel cell stack 1 detected by the wet/dry state detection unit 210 is within the wet/dry appropriate range set by the wet/dry appropriate range setting unit 240. In the present embodiment, the wet/dry appropriate range determination unit 260 determines whether or not the detected wet/dry state has dropped to or below the lower limit value of the wet/dry appropriate range. Then, this determination result is output to the output voltage upper limit value resetting unit 270.

The output voltage upper limit value resetting unit 270 resets to increase the upper limit value of the output voltage of the fuel cell stack 1 set by the output voltage upper/lower limit value setting unit 230 if it is determined by the wet/dry appropriate range determination unit 260 that the detected wet/dry state is outside the wet/dry appropriate range, i.e. if it is determined that the detected wet/dry state has dropped to or below the lower limit value of the wet/dry appropriate range.

Specifically, the output voltage upper limit value resetting unit 270 resets the upper limit value of the output voltage of the fuel cell stack 1 set by the output voltage upper/lower limit value setting unit 230 to a predetermined voltage higher than this upper limit value if it is determined that the detected wet/dry state has dropped to or below the lower limit value of the wet/dry appropriate range. It should be noted that this "predetermined voltage" is an upper limit value during drying in the idle stop operation. The reset upper limit value (hereinafter, referred to as a "reset upper limit value") is described in detail using a graph of FIG. 4.

The cathode gas supply control unit 280 executes a control to intermittently supply the cathode gas to the fuel cell stack 1 with the output voltage of the fuel cell stack 1 set at a value between the upper limit value and the lower limit value set by the output voltage upper/lower limit value setting unit 230 for the compressor 22 of the cathode gas supplying/discharging device 2.

Specifically, the cathode gas supply control unit 280 intermittently operates the compressor 22 on the basis of the determination result of the output voltage determination unit 250. Specifically, the cathode gas supply control unit 280 outputs an ON command for driving the compressor 22 to the compressor 22 if it is determined by the output voltage determination unit 250 that the detected output voltage has dropped to or below the lower limit value of the output voltage. The cathode gas supply control unit 280 outputs an OFF signal for stopping the compressor 22 to the compressor 22 if it is determined by the output voltage determination unit 250 that the detected output voltage has increased to or above the upper limit value of the output voltage.

If the cathode gas is supplied to the fuel cell stack 1 during the idle stop operation, the supplied oxygen and the residual hydrogen induce an electrochemical reaction as described above. At this time, since the output current is not extracted from the fuel cell stack 1, the output voltage of the fuel cell stack 1 (i.e. the sum of the cell voltage of each fuel cell constituting the fuel cell stack 1 if the fuel cells are connected in series) gradually increases. If the output voltage of the fuel cell stack 1 reaches the upper limit value, the supply of the cathode gas to the fuel cell stack 1 is stopped. However, since the electrochemical reaction of the supplied oxygen and the residual hydrogen continues, the output voltage of the fuel cell stack 1 overshoots unless the output voltage is extracted. Thus, in the present embodiment, an excess of generated power is extracted as the output current and stored in the unillustrated high-voltage battery.

Figure 4:
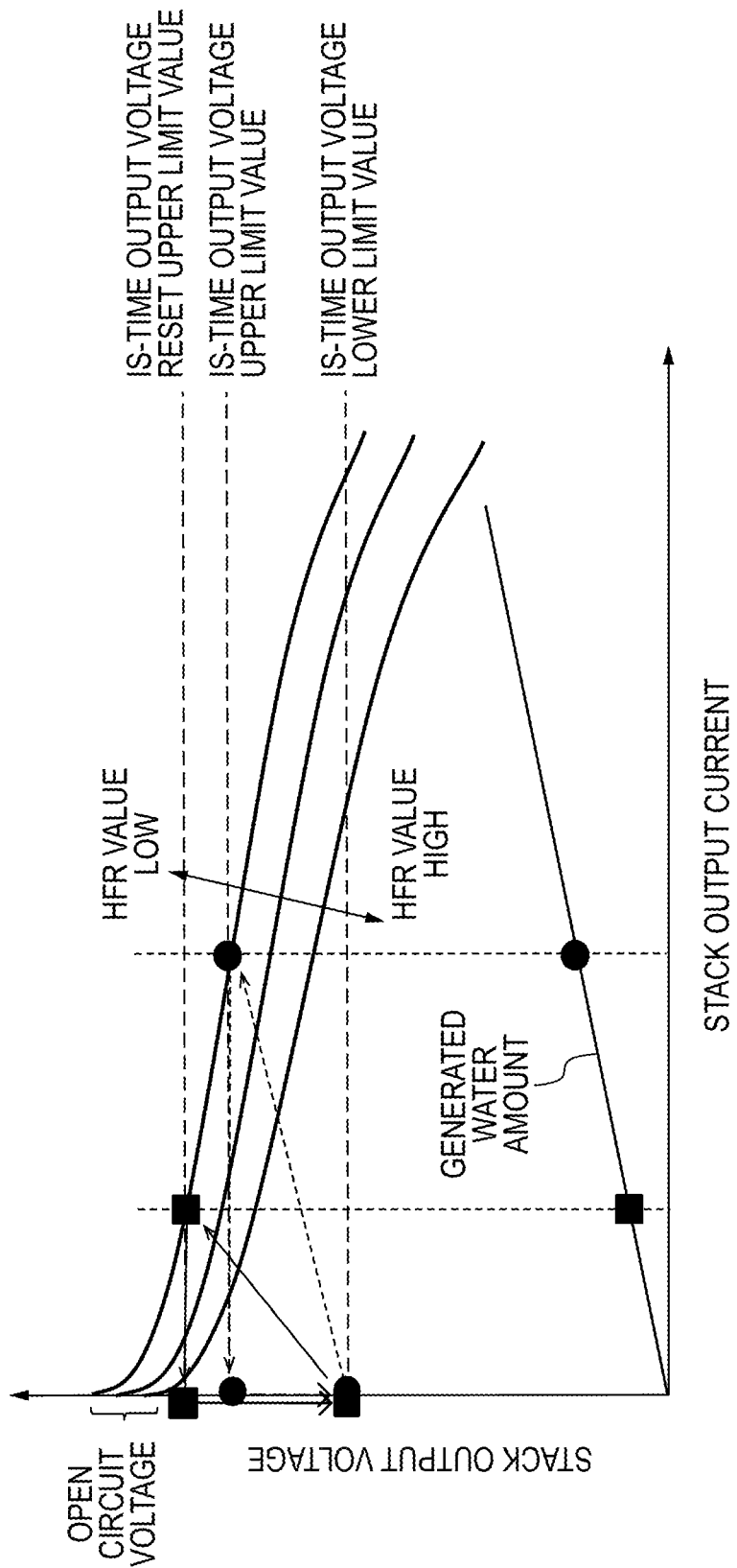
FIG. 4 is a graph showing an I-V characteristic of the fuel cell stack shown in FIG. 1.

Next, a relationship of the output current and the output voltage of the fuel cell stack 1 is described. FIG. 4 is a graph showing an I-V characteristic (relationship of the stack output voltage and the stack output current) of the fuel cell stack 1 shown in FIG. 1. In this graph, each of three thick curves represents the I-V characteristic of the fuel cell stack 1 at a predetermined HFR. As shown in FIG. 4, an HFR value becomes lower as the stack output voltage increases with respect to a predetermined stack output current.

Further, a graph showing a relationship of the stack output current and the amount of water generated in the fuel cell stack 1 (hereinafter, referred to as a "generated water amount") is also shown in FIG. 4. As is understood from this straight line, the amount of the water generated in the fuel cell stack 1 is substantially in proportion to the stack output current output at that time.

It should be noted that the stack output voltage when the stack output current of each curve is 0 is referred to as an "open circuit voltage". If the output voltage of the fuel cell stack 1 increases to or above this open circuit voltage, the stack output voltage becomes 0 as shown in the I-V characteristic. Thus, by increasing the output voltage of the fuel cell stack 1 to or above the open circuit voltage, the generation of water can be suppressed.

In FIG. 4, an "IS-time output voltage upper limit value" and an "IS-time output voltage lower limit value" respectively indicate the upper limit value and the lower limit value of the output voltage set by the output voltage upper/lower limit value setting unit 230. Further, an "IS-time output voltage reset upper limit value" indicates the reset upper limit value of the output voltage reset by the output voltage upper limit value resetting unit 270.

Further, a black circle in FIG. 4 indicates a state change of water balance in the fuel cell stack 1 in a normal control during the idle stop operation and a black rectangle indicates a state change of water balance in the fuel cell stack 1 when the upper limit value of the output voltage is reset. A control with the output voltage set at a value between the upper limit value, which is not reset, and the lower limit value is referred to as a "normal idle stop operation control" and a control with the output voltage set at a value between the reset upper limit value and the lower limit value when the output voltage is reset is referred to as a "reset idle stop operation control".

In the normal idle stop operation control, a transition is made to the black circle of the IS-time output voltage upper limit value intersecting with a I-V characteristic line due to the supply of the cathode gas. At this time, water is generated by the electrochemical reaction of the supplied oxygen and the residual hydrogen, whereby the stack output current becomes 0 and the stack output voltage also decreases to the IS-time output voltage lower limit value. On the other hand, since the upper limit value of the output voltage is increased to the reset upper limit value in the reset idle stop operation control, a transition is made to the black rectangle of an IS dry-time output voltage upper limit value intersecting with the I-V characteristic line due to the supply of the cathode gas. At this time, as during the normal idle stop operation control, water is generated by the electrochemical reaction of the supplied oxygen and the residual hydrogen, whereby the stack output current becomes 0 and the stack output voltage also decreases to the IS-time output voltage lower limit value. Thus, the generated water amount by the intermittent supply of the cathode gas during the idle stop operation can be reduced by increasing the upper limit value of the output voltage.

Specifically, in the present embodiment, after a transition to the idle stop operation, the output voltage of the fuel cell stack 1 is controlled between the IS-time output voltage lower limit value and the IS-time output voltage upper limit value according to the intermittent supply of the cathode gas by the cathode gas supply control unit 280. By satisfying a predetermined condition, the upper limit value of the output voltage is switched from the IS-time output voltage upper limit value to the IS-time output voltage reset upper limit value. In this way, the flow rate of the cathode gas to be supplied to the fuel cell stack 1 is increased and the generated water amount is reduced. Thus, the electrolyte membranes of the fuel cells in the fuel cell stack 1 can be efficiently dried.

Figure 5:
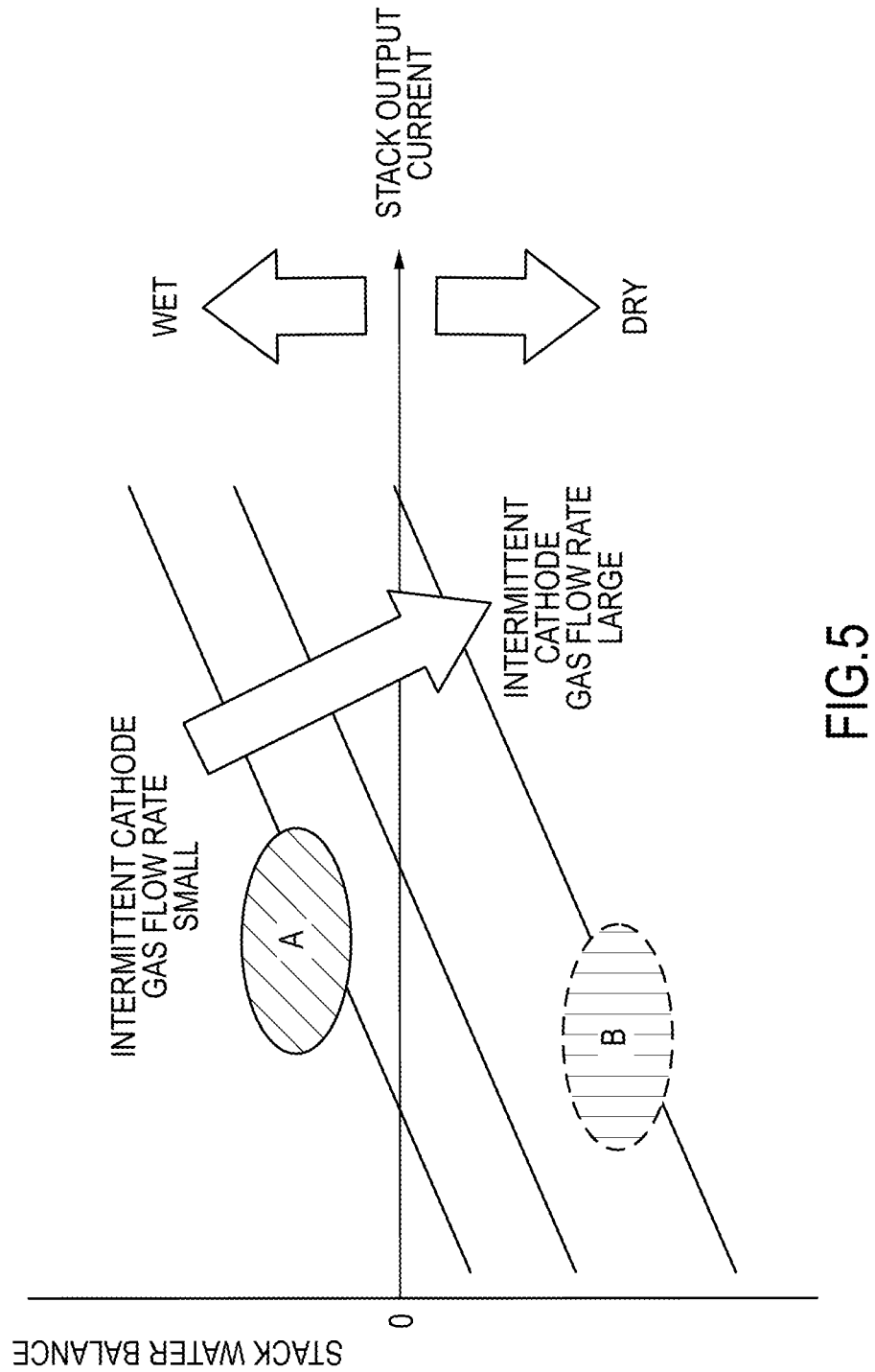
FIG. 5 is a graph showing a relationship of an output current and a stack water balance of the fuel cell stack shown in FIG. 1, FIG. 6 are time charts showing a state change of each physical quantity during an idle stop operation process in the first embodiment of the present invention.

FIG. 5 is a graph showing a relationship of the output current and a stack water balance of the fuel cell stack 1 shown in FIG. 1. Normally, in the fuel cell system 100, the cathode gas flow rate, the cathode gas pressure, the anode gas circulation flow rate, the stack temperature (cooling water temperature) and the like are controlled such that the stack water balance becomes 0. Here, three parallel lines show relationships of the output voltage and the stack water balance of the fuel cell stack 1 when the flow rate of the cathode gas intermittently supplied (hereinafter, also referred to as an "intermittent cathode gas flow rate") is equal.

As the intermittent cathode gas flow rate increases, the water balance with respect to the stack output current decreases. Specifically, the fuel cell stack 1 is understood to be dry if the cathode gas flow rate is high. Thus, if it is desired to dry the fuel cell stack 1 as in the present embodiment, a control to increase the cathode gas flow rate is a technique. If the supply amount of the cathode gas is small and the cathode gas is intermittently supplied as in the idle stop operation, the upper limit value of the output voltage at a timing of stopping the intermittent supply is increased as shown in FIG. 4. Since the generated water amount can also be suppressed in this way, the drying of the fuel cell stack 1 is further promoted.

Here, if the cathode gas is intermittently supplied during the idle stop operation, the output voltage overshoots the upper limit value thereof as described above. In such a case, a surplus exceeding the upper limit value of the output voltage is output as a current to charge the high-voltage battery. Water is generated by the electrochemical reaction of the supplied oxygen and the residual hydrogen. Thus, during the normal idle stop operation control of the fuel cell stack 100, the inside of the fuel cell stack 1 is a water balance region of an obliquely hatched part A of FIG. 5 where the stack water balance is on a wet side.

On the other hand, during the reset idle stop operation control of the fuel cell system 100, particularly immediately after a switch of the upper limit value of the output voltage of the fuel cell stack 1, the inside of the fuel cell stack 1 is a water balance region of a vertically hatched part B of FIG. 5. In the present embodiment, the HFR of the fuel cell stack can be controlled to or near a target HFR value also during the idle stop operation of the fuel cell system 100 by increasing the output voltage of the fuel cell stack 1 if necessary.

Next, the operation of the fuel cell system 100 in the present embodiment is described using time charts of FIG. 6. FIG. 6 are time charts showing a state change of each physical quantity during an idle stop operation process in the first embodiment of the present invention.

Here, the physical quantities include the output voltage and the output current of the fuel cell stack 1, the cathode gas flow rate and the wet/dry state of the electrolyte membranes of the fuel cells. First, when a transition is made from the normal operation to the idle stop operation, the upper and lower limit values of the output voltage are set by the output voltage upper/lower limit value setting unit 230 (see FIG. 6A).

When the output voltage reaches the lower limit value, the cathode gas supply control unit 280 of the controller 200 drives the compressor 22 to supply the cathode gas to the fuel cell stack 1. As the cathode gas is supplied, the supplied oxygen and the residual hydrogen react and the output voltage of the fuel cell stack 1 increases. When the output voltage reaches the upper limit value, the cathode gas supply control unit 280 stops the compressor 22 to end the supply of the cathode gas (see FIG. 6C). At this time, the electrochemical reaction of the supplied oxygen and the residual hydrogen continues, but the output voltage is kept at the upper limit value. Thus, excess power becomes the output current of the fuel cell stack 1 to charge the high-voltage battery (see FIG. 6B).

As described above, the output voltage vertically pulsates on the basis of the intermittent supply of the cathode gas and the output current is intermittently output at a timing when the output voltage reaches the upper limit value. Further, at a timing of supplying the cathode gas, the wet/dry state of the fuel cell stack 1 (degree of wetness of the electrolyte membranes of the fuel cells) estimated by the wet/dry state detection unit 210 transitions from the dry side to the wet side in a stepped manner.

In the state change shown in FIG. 6, the wet/dry state of the fuel cell stack 1 reaches the lower limit value of the wet/dry appropriate range by the fourth supply of the cathode gas. At this time, the output voltage upper limit value resetting unit 270 resets to increase the upper limit value of the output voltage and, thereafter, the output voltage pulsates between the reset upper limit value and the lower limit value.

It should be noted that the reset upper limit value is shown as the IS-time output voltage reset upper limit value in FIG. 4. In this FIG. 4, the IS-time output voltage reset upper limit value is described as a value lower than the open circuit voltage at which the output current becomes 0. However, the IS-time output voltage reset upper limit value may be set at a value equal to or higher than the open circuit voltage of the fuel cell stack 1. By setting in this way, water is not generated when the output voltage of the fuel cell stack 1 reaches the reset upper limit value after the output voltage is reset. This can sufficiently prevent the electrolyte membranes of the fuel cells from becoming excessively wet and enable the electrolyte membranes to be dried in a short time during the idle stop operation. In the present embodiment, a case where the IS-time output voltage reset upper limit value is set equal to or higher than the open circuit voltage is described below.

When the output voltage of the fuel cell stack 1 reaches the lower limit value (see FIG. 6A) after the wet/dry state of the fuel cell stack 1 estimated by the wet/dry state detection unit 210 reaches the lower limit value of the wet/dry appropriate range (see FIG. 6D), the cathode gas supply control unit 280 drives the compressor 22 to supply the cathode gas to the fuel cell stack 1. Since the upper limit value of the cathode gas flow rate is set in the present embodiment, the number of revolutions of the compressor 22 is controlled by the cathode gas supply control unit 280 so that this upper limit value of the cathode gas flow rate is reached (FIG. 6C).

When the cathode gas is supplied to the fuel cell stack 1, the output voltage of the fuel cell stack 1 starts increasing. When this output voltage reaches the reset upper limit value set by the output voltage upper limit value resetting unit 270, the cathode gas supply control unit 280 stops the compressor 22 to stop the supply of the cathode gas.

At this time, since no water is generated while the output voltage is equal to or higher than the open circuit voltage as shown in FIG. 6B, the wet/dry state of the fuel cell stack 1 suddenly transitions to the dry side. Thereafter, the output voltage of the fuel cell stack 1 gradually decreases. When the output voltage reaches the lower limit value again (see FIG. 6A), the cathode gas supply control unit 280 drives the compressor 22 to supply the cathode gas to the fuel cell stack 1. When the cathode gas is supplied to the fuel cell stack 1, the output voltage of the fuel cell stack 1 starts increasing. When this output voltage reaches the reset upper limit value set by the output voltage upper limit value resetting unit 270, the cathode gas supply control unit 280 stops the compressor 22 to stop the supply of the cathode gas.

In an example of FIG. 6, the wet/dry state of the fuel cell stack 1 reaches the upper limit value by the second supply of the cathode gas after the upper limit value of the output voltage is reset to increase. Although a control thereafter is not described in the present embodiment, the output voltage upper limit value resetting unit 270 may decrease the currently set reset upper limit value gradually or in a stepwise manner if necessary so that the reset upper limit value becomes equal to or lower than the open circuit voltage of the fuel cell stack 1. In this way, the wet/dry state of the fuel cell stack 1 can be controlled to the wet/dry appropriate range set by the wet/dry appropriate range setting unit 240 without increasing (drying) the wet/dry state beyond the upper limit value.

Figure 7:
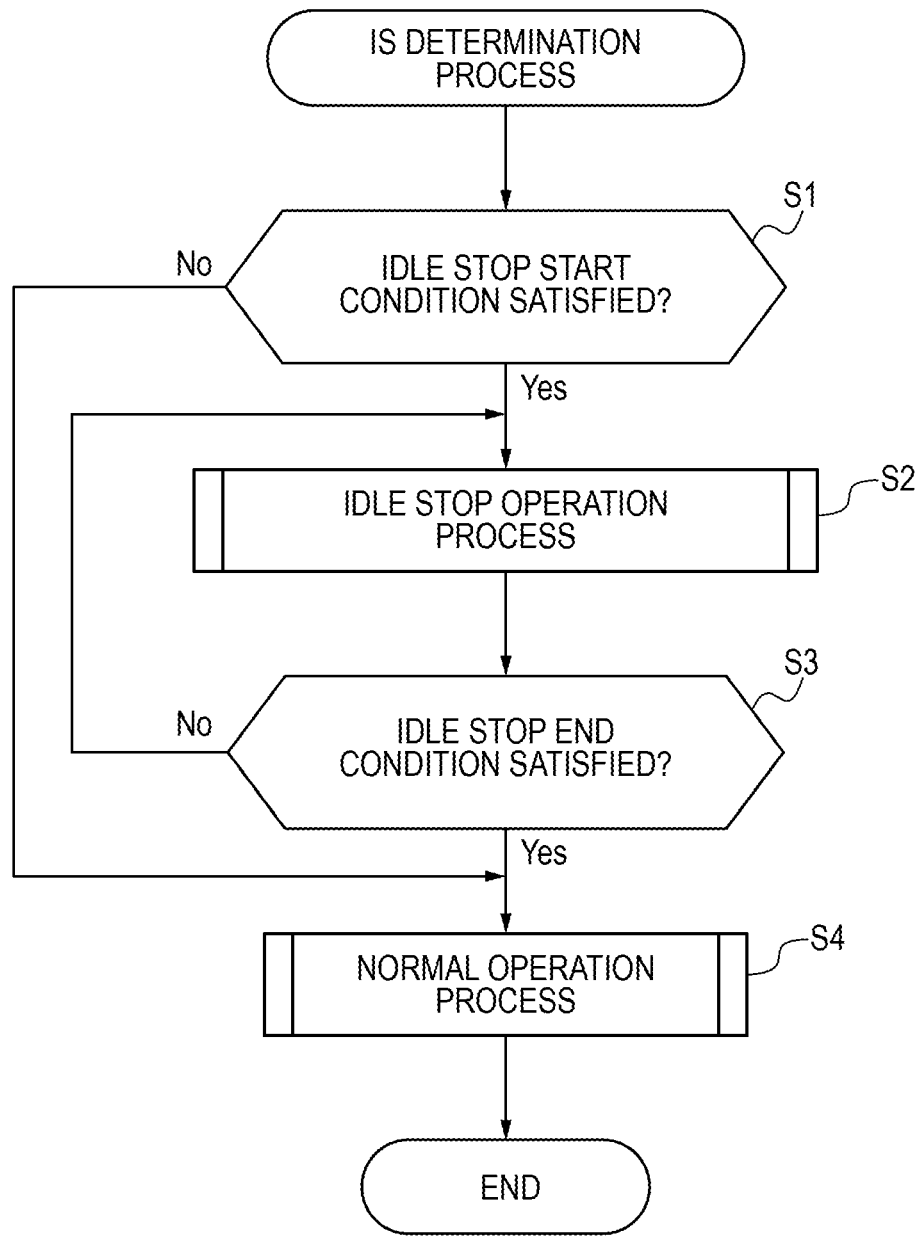
FIG. 7 is a flow chart showing an example of an idle stop determination process executed by the controller in the first embodiment of the present invention.
Figure 8:
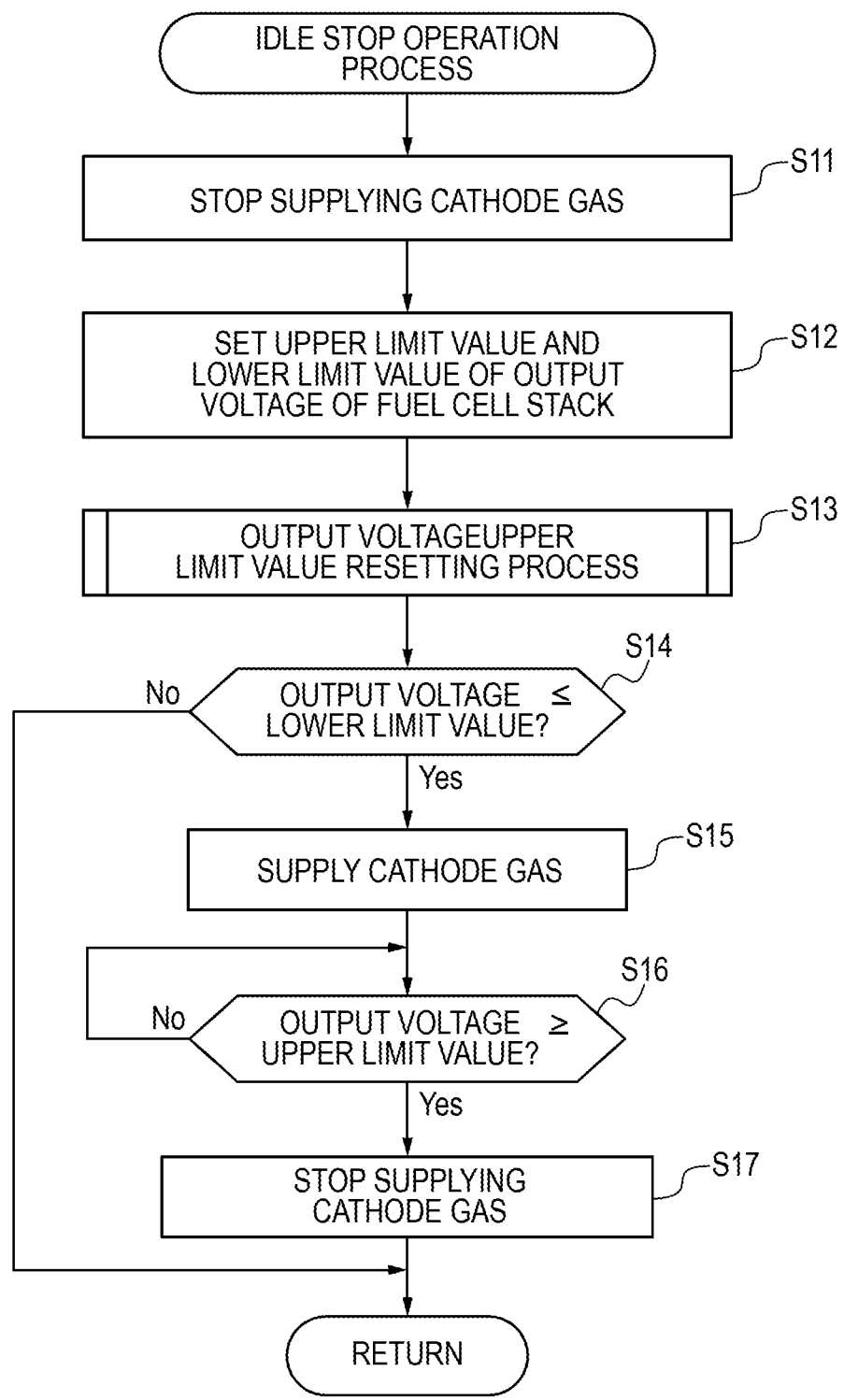
FIG. 8 is a flow chart showing an example of an idle stop operation process as a subroutine of the idle stop determination process of FIG. 7.
Figure 9:
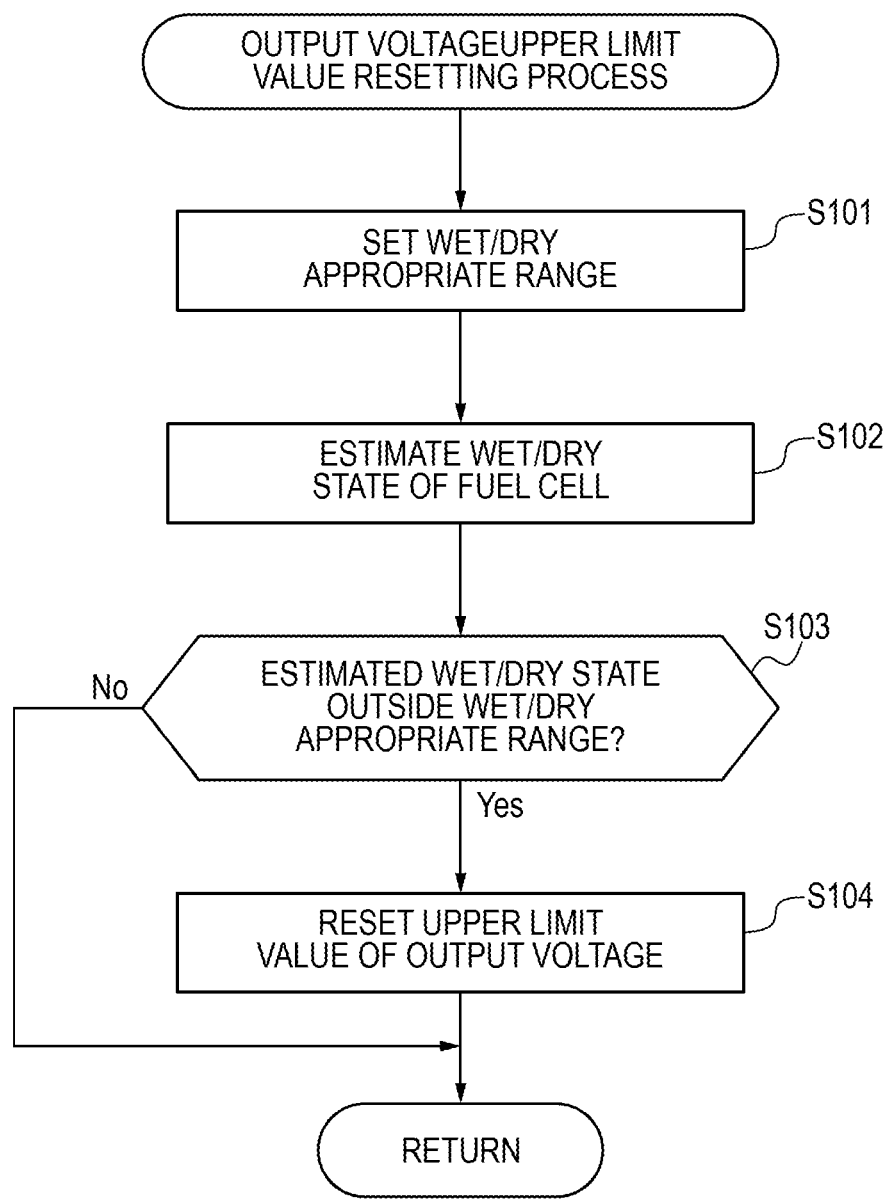
FIG. 9 is a flow chart showing an example of an output voltage upper limit value resetting process as a subroutine of the idle stop operation process of FIG. 8.

Next, the operation of the fuel cell system 100 of the present embodiment is described using flow charts shown in FIGS. 7 to 9. In the present embodiment, the controller 200 executes a process relating to the idle stop operation of the fuel cell stack 100. FIG. 7 is a flow chart showing an example of an idle stop determination process executed by the controller 200 in the first embodiment of the present invention. This idle stop determination process is executed, for example, every 10 msec by the controller 200 of the fuel cell stack 100. It should be noted that a sequence of Steps of each flow chart may be changed without causing any contradiction.

In this idle stop determination process, the controller 200 first determines whether or not a predetermined idle stop start condition has been satisfied (Step S1). If it is determined that the idle stop start condition has not been satisfied, the controller 200 proceeds to Step S4 of the process flow to execute (continue) a normal operation process and ends this idle stop determination process.

On the other hand, if it is determined that the idle stop start condition has been satisfied, the controller 200 proceeds to Step S2 of the process flow to execute the idle stop operation process (Step S2). Subsequently, the controller 200 determines whether or not a predetermined idle stop end condition has been satisfied (Step S3). The controller 200 repeats processings of these Steps S2 and S3 until this idle stop end condition is satisfied. If it is determined that the idle stop end condition has been satisfied, the controller 200 executes the normal operation process (Step S4) and ends this idle stop determination process.

It should be noted that since the idle stop start condition and the idle stop end condition may be determined using known conditions, these are not described in detail here. Further, since a known normal operation process may be used as the normal operation process of the fuel cell system 100, this process is not described in detail below. Particularly, the idle stop operation process of the present embodiment is described in detail below using the flow charts.

FIG. 8 is a flow chart showing an example of the idle stop operation process as a subroutine of the idle stop determination process shown in Step S2 of FIG. 7. As shown in Step S1 of the idle stop determination process, the idle stop operation process is executed if the idle stop start condition is satisfied.

In this idle stop operation process, the cathode gas supply control unit 280 of the controller 200 first stops the compressor 22 to stop the supply of the cathode gas (Step S11). Then, the output voltage upper/lower limit value setting unit 230 sets the upper and lower limit values of the output voltage of the fuel cell stack 1 during the idle stop operation (Step S12). Then, the output voltage upper limit value resetting unit 270 executes an output voltage upper limit value resetting process (Step S13).

Subsequently, the output voltage determination unit 250 determines whether or not the output voltage of the fuel cell stack 1 detected by the voltage sensor 52 has dropped to or below the lower limit value set in Step S12 (Step S14). If the output voltage is determined to be larger than the lower limit value, the controller 200 directly ends this idle stop operation process. Thereafter, the controller 200 executes this idle stop operation process until the idle stop end condition is satisfied in Step S3.

On the other hand, if the output voltage is determined to be equal to or lower than the lower limit value, the cathode gas supply control unit 280 drives the compressor 22 to supply the cathode gas to the fuel cell stack 1 (Step S15).

Then, the output voltage determination unit 250 determines whether or not the output voltage of the fuel cell stack 1 detected by the voltage sensor 52 has increased to or above the upper limit value set in Step S12 or the upper limit value reset in Step S104 of an output voltage upper limit value resetting process to be described later (Step S16). If the output voltage is determined to be below the upper limit value, the controller 200 waits in this Step S16 until the output voltage increases to or above the upper limit value.

On the other hand, if the output voltage is determined to be equal to or higher than the upper limit value, the cathode gas supply control unit 280 stops the compressor 22 to stop the supply of the cathode gas to the fuel cell stack 1 (Step S17) and ends this idle stop operation process.

FIG. 9 is a flow chart showing an example of the output voltage upper limit value resetting process as a subroutine of the idle stop operation process of FIG. 8. The controller 200 executes this output voltage upper limit value resetting process if the upper and lower limit values of the output voltage of the fuel cell stack 1 are set in Step S12 of the idle stop operation process.

In this output voltage upper limit value resetting process, the wet/dry appropriate range setting unit 240 of the controller 200 sets the wet/dry appropriate range of the fuel cell stack 1 by reading necessary data from an unillustrated memory or the like (Step S101).

Subsequently, the wet/dry state detection unit 210 estimates the wet/dry state of the fuel cell stack 1 on the basis of the internal impedance of the fuel cell stack 1 obtained from the impedance measuring device 6 (Step S102).

Then, the wet/dry appropriate range determination unit 260 determines whether or not the wet/dry state of the fuel cell stack 1 estimated in Step S102 is outside the wet/dry appropriate range set in Step S11 (Step S103). If the wet/dry state is determined to be within the wet/dry appropriate range, the controller 200 directly ends this output voltage upper limit value resetting process.

On the other hand, if the wet/dry state is determined to be outside the wet/dry appropriate range, the output voltage upper limit value resetting unit 270 resets to increase the upper limit value of the output voltage set in Step S12 of the idle stop operation process (Step S104). Specifically, the output voltage upper limit value resetting unit 270 obtains open circuit voltage data of the fuel cell stack 1 described using FIG. 4 from the unillustrated memory and sets the upper limit value of the output voltage at a value obtained by adding a predetermined margin to this open circuit voltage.

As just described, if the upper limit value of the output voltage is reset in Step S104 of the output voltage upper limit value resetting process, the controller 200 performs processings of Steps S14 to S17 of the idle stop operation process using the reset upper limit value and the lower limit value of the output voltage.

As described above, the fuel cell system 100 of the present embodiment is the fuel cell system 100 capable of executing the idle stop operation to selectively stop the power generation of the fuel cell stack 1 (fuel cells) according to a required output of the load such as the drive motor and intermittently supply the cathode gas to the fuel cell stack 1 from the cathode gas supplying/discharging device 2

(cathode supply device) during an operation stop. The fuel cell system 100 includes the wet/dry state detection unit 210 configured to detect the wet/dry state of the fuel cell stack 1 (degree of wetness of the electrolyte membrane of each fuel cell) (estimation, detection or the like may be made by receiving the measurement result from the impedance measuring device 6), the output voltage upper/lower limit value setting unit 230 configured to set the upper and lower limit values of the output voltage of the fuel cell stack 1 during the idle stop operation and the wet/dry appropriate range setting unit 240 configured to set the wet/dry appropriate range in which the wet/dry state of the fuel cell stack 1 during the idle stop operation is appropriate. Further, the fuel cell system 100 includes the wet/dry appropriate range determination unit 260 configured to determine whether or not the wet/dry state of the fuel cell stack 1 detected by the wet/dry state detection unit 210 is within the wet/dry appropriate range set by the wet/dry appropriate range setting unit 240 and the output voltage upper limit value resetting unit 270 configured to reset to increase the set upper limit value of the output voltage of the fuel cell stack 1 if the wet/dry state of the fuel cell stack 1 detected by the wet/dry state detection unit 210 is determined to be outside the set wet/dry appropriate range by the wet/dry appropriate range determination unit 260. The fuel cell system 100 includes the controller 200 (control unit; it should be noted that the cathode gas supply control unit 280 included in the controller 200 may be configured to output an ON/OFF signal of the compressor 22 as in the above embodiment) configured to execute a control to intermittently supply the cathode gas from the cathode gas supplying/discharging device 2 (cathode gas supply device) with the output voltage of the fuel cell stack 1 set at a value between the upper limit value reset by the output voltage upper limit value resetting unit 270 and the lower limit value if the output voltage upper limit value resetting unit 270 resets to increase the upper limit value of the output voltage of the fuel cell stack 1.

Since the cathode gas supply control unit 280 intermittently supplies the cathode gas during the idle stop operation of the fuel cell system 100, water is generated by the electrochemical reaction of the supplied oxygen and the residual hydrogen. This causes the wet/dry state in the fuel cell stack 1 to gradually transition to the wet side. In this case, according to the fuel cell system 100 of the present embodiment, the wet/dry appropriate range is set for the wet/dry state in advance and the upper limit value of the output voltage of the fuel cell stack 1 is reset to increase if the lower limit value of the wet/dry appropriate range (lower limit value of the measured HFR) is reached. By resetting the upper limit value of the output voltage in this way, the cathode gas supply control unit 280 intermittently operates the compressor 22 with the output voltage of the fuel cell stack 1 set at a value between the reset upper limit value and the lower limit value during the idle stop operation. Thus, it can be effectively suppressed that the fuel cell stack 1 becomes excessively wet during the idle stop operation and the wet/dry state of the fuel cell stack 1 can be controlled within the wet/dry appropriate range.

Here, in a conventional fuel cell system, residual hydrogen and supplied oxygen induce an electrochemical reaction to generate water in a fuel cell stack by supplying cathode gas to the fuel cell stack during an idle stop operation. Thus, as an idle stop operation time becomes longer, the inside of the fuel cell stack becomes excessively wet, whereby anode gas flow passages are clogged during a return from the idle stop operation, leading to a possibility of hydrogen deficiency. In the fuel cell system 100 of the present embodiment, the upper limit value of the output voltage of the fuel cell stack 1 is reset to increase by the output voltage upper limit value resetting unit 270 if the predetermined condition is satisfied during the idle stop operation. Thus, the electrochemical reaction of the residual hydrogen and the supplied oxygen can be suppressed. In this way, a possibility of hydrogen deficiency, which could be conventionally problematic, can be eliminated.

Further, the fuel cell system 100 of the present embodiment is configured such that the upper limit value of the output voltage reset by the output voltage upper limit value resetting unit 270 becomes higher than the open circuit voltage of the fuel cell stack 1. By setting the reset upper limit value at a value higher than the open circuit voltage of the fuel cell stack 1 in this way, no water is generated by the I-V characteristic of the fuel cell stack 1 even if the output voltage of the fuel cell stack 1 is increased to the reset upper limit value. Further, since the upper limit value of the output voltage is reset to increase, the operation time of the compressor 22 by the cathode gas supply control unit 280 also becomes longer. Thus, the inside of the fuel cell stack 1 on the wet side can be sufficiently dried and the wet/dry state of the fuel cell stack 1 can be controlled/managed within the wet/dry appropriate range also during the idle stop operation.

Since the wet/dry state of the fuel cell stack 1 during the idle stop operation can be properly managed in this way, the output voltage of the fuel cell stack 1 can be stabilized when a return is made from the idle stop operation to the normal operation (normal power generation control). Contrary to this, in the case of stopping the fuel cell vehicle from the idle stop operation, a time until the fuel cell vehicle is completely stopped can be shortened since the wet/dry state of the fuel cell stack 1 does not transition on the wet side.

Further, since the inside of the fuel cell stack 1 is sufficiently dried when the fuel cell system vehicle is stopped, residual moisture is sufficiently eliminated before the vehicle stops. Thus, even if outside temperature decreases below zero during the vehicle stop, it is possible to prevent the damage of a driving unit due to the condensation/solidification of moisture contained in the anode-off gas or cathode off-gas in the anode gas circulation passage, the cathode gas supply passage, the cathode gas discharge passage or the like. In this way, sub-zero start-up performance of the fuel cell vehicle with the fuel cell system 100 of the present embodiment can be improved.

Further, a control method for the fuel cell system 100 of the present embodiment is a control method for the fuel cell system 100 capable of executing the idle stop operation to selectively stop the power generation of the fuel cell stack 1 (fuel cells) according to a required output of the load and intermittently supply the cathode gas to the fuel cell stack 1 during an operation stop and includes a step of setting the upper and lower limit values of the output voltage of the fuel cell stack 1 during the idle stop operation, a step of intermittently supplying the cathode gas with the output voltage of the fuel cell stack 1 set at a value between the upper limit value and the lower limit value, a step of detecting the wet/dry state of the fuel cell stack 1, a step of setting the wet/dry appropriate range in which the wet/dry state of the fuel cell stack 1 during the idle stop operation is appropriate, a step of determining whether or not the detected wet/dry state of the fuel cell stack 1 is within the set wet/dry appropriate range and a step of resetting the output voltage of the fuel cell stack 1 if the detected wet/dry state of the fuel cell stack 1 is determined to be outside the set wet/dry appropriate range. Further, the control method for the fuel cell stack 100 is configured such that the cathode gas is intermittently supplied with the output voltage of the fuel cell stack 1 set at a value between the reset upper limit value and the lower limit value in the cathode gas supplying step if the output voltage of the fuel cell stack 1 is reset. Here, in the resetting of the output voltage of the fuel cell stack 1, the upper limit value of the output voltage (or a control range defined by the upper and lower limit values) may be set to increase. Since the control method for the fuel cell system 100 of the present embodiment is configured as just described, effects similar to those of the above fuel cell system 100 can be achieved. Specifically, according to the control method for the fuel cell system 100 of the present embodiment, the output voltage of the fuel cell stack 1 during a return from the idle stop operation can be stabilized, the stop time of the fuel cell vehicle from the idle stop operation can be shortened and sub-zero start-up performance can be improved.

It should be noted that a case where the control method of the present embodiment is realized on the basis of the output voltage and output current of the fuel cell stack 1 has been described in the present embodiment. However, the present invention can realize not only a control of the physical quantities of the fuel cell stack 1, but also the control method of the present embodiment on the basis of the physical quantities of each fuel cell in the fuel cell stack 1.

It should be noted that, in the present embodiment, the output voltage upper limit value resetting unit 270 resets to increase the set upper limit value of the output voltage of the fuel cell stack 1 if the wet/dry state of the fuel cell stack 1 detected by the wet/dry state detection unit 210 is determined to be outside the wet/dry appropriate range by the wet/dry appropriate range determination unit 260. However, the present invention is not limited to such a configuration. Under such a condition, the output voltage upper limit value resetting unit 270 (or controller 200) may reset, for example, both upper and lower limit values set by the output voltage upper/lower limit value setting unit 230, i.e. a variation range (band) of the output voltage or reset an intermediate value of that variation range other than resetting the upper limit value of the output voltage. Further, in the case of resetting the variation range of the output voltage, the upper limit value may be increased and the lower limit value may also be increased. Even if such a configuration is adopted, water is not generated in the fuel cell stack 1 near the upper limit value of the output voltage, wherefore the wet/dry state in the fuel cell stack 1 can be transitioned to the dry side.

Second Embodiment

A second embodiment of the present invention is described mainly on points of difference from the first embodiment below. It should be noted that since an overall configuration of a fuel cell system 100 is substantially similar to that of the first embodiment, the overall configuration of the system is described using FIG. 1 and not described in detail here. Further, in the present embodiment, parts performing functions similar to those of the above first embodiment are denoted by the same reference signs and repeated description is omitted as appropriate.

In the above first embodiment, how to recover the normal idle stop operation control after the upper limit value of the output voltage of the fuel cell stack 1 is reset to increase is not specifically described. The second embodiment differs from the first embodiment in that the reset upper limit value is returned to the initial upper limit value.

Figure 10:
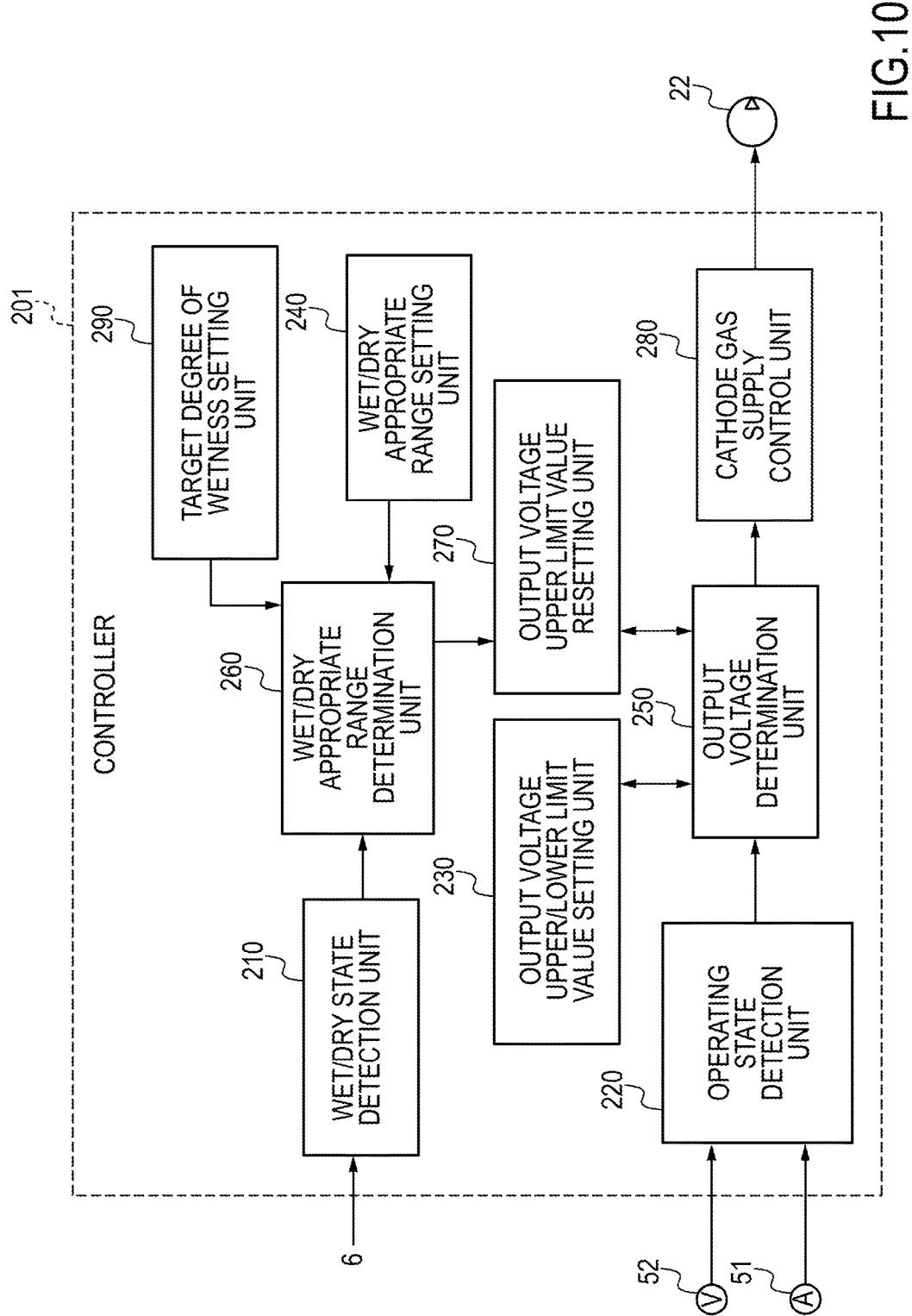
FIG. 10 is a block diagram showing an example of a functional configuration of a controller for controlling a fuel cell system in a second embodiment of the present invention.

First, control functions of a controller 201 for controlling the fuel cell system 100 of the present embodiment are described. FIG. 10 is a block diagram showing an example of a functional configuration of the controller 201 for controlling the fuel cell system 100 in the second embodiment of the present invention. It should be noted that functions relating to the present invention are mainly shown in the functional block diagram of the controller 201 shown in FIG. 10 and some of functions relating to a normal operation control and other controls of the fuel cell system 100 are omitted.

As shown in FIG. 10, the controller 201 of the present embodiment includes a wet/dry state detection unit 210, an operating state detection unit 220, an output voltage upper/lower limit value setting unit 230, a wet/dry appropriate range setting unit 240, an output voltage determination unit 250, a wet/dry appropriate range determination unit 260, an output voltage upper limit value resetting unit 270, a cathode gas supply control unit 280 and a target wet/dry degree setting unit 290.

The target wet/dry degree setting unit 290 sets a target degree of wetness (wet/dry degree) or target wet/dry range of a fuel cell stack 1 during an idle stop operation if an upper limit value of an output voltage of the fuel cell stack 1 is reset. In the present embodiment, the target degree of wetness or target wet/dry range of the fuel cell stack 1 during the idle stop operation is set to efficiently return to a normal operation from the idle stop operation and stop a vehicle. The set target degree of wetness or target wet/dry range is output to the wet/dry appropriate range determination unit 260.

The wet/dry appropriate range determination unit 260 compares the wet/dry state of the fuel cell stack 1 estimated by the wet/dry state detection unit 210 and the obtained target degree of wetness or target wet/dry range and outputs a comparison result to the output voltage upper limit value resetting unit 270.

In the present embodiment, the output voltage upper limit value resetting unit 270 returns the reset upper limit value of the output voltage of the fuel cell stack 1 to the upper limit value before resetting on the basis of the comparison result obtained from the wet/dry appropriate range determination unit 260. Specifically, if the wet/dry appropriate range determination unit 260 determines that the current wet/dry state of the fuel cell stack 1 estimated by the wet/dry state detection unit 210 has reached the target degree of wetness or target wet/dry range set by the target wet/dry degree setting unit 290, the output voltage upper limit value resetting unit 270 returns the reset upper limit value to the upper limit value before resetting.

Figure 11:
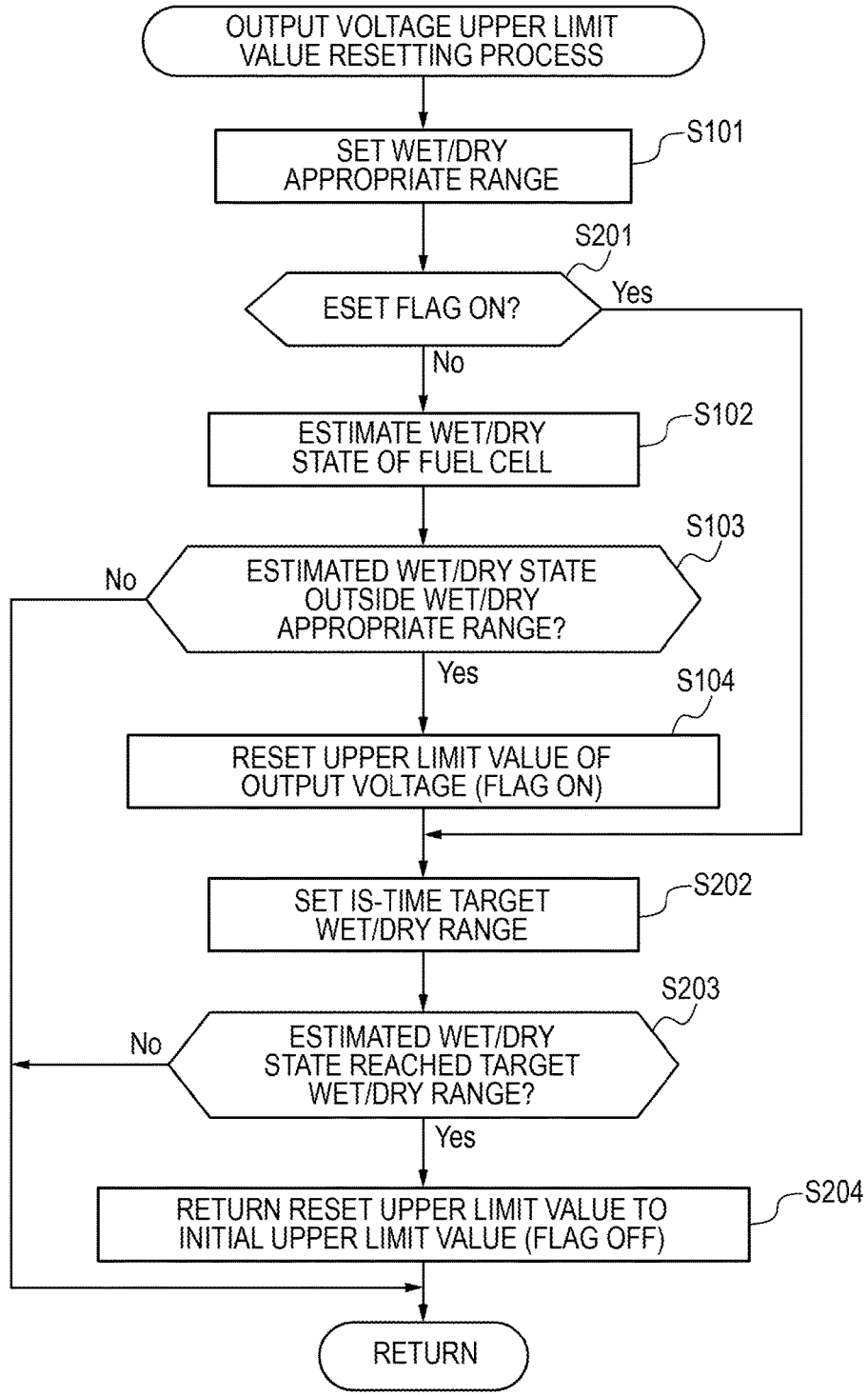
FIG. 11 is a flow chart showing an example of an output voltage upper limit value resetting process executed by the controller in the second embodiment of the present invention, FIG. 12 are examples of time charts showing a state change of each physical quantity during an idle stop operation process in the second embodiment of the present invention, FIG. 13 are other examples of the time charts showing the state change of each physical quantity during the idle stop operation process in the second embodiment of the present invention.
Figure 12A:
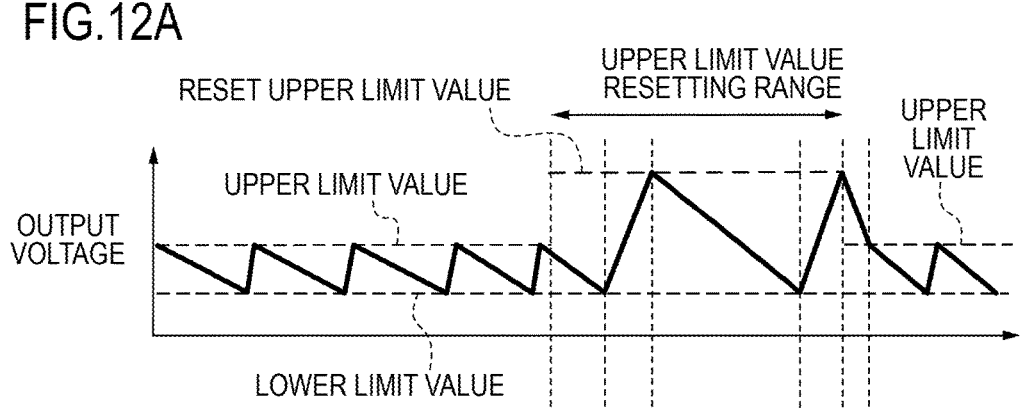
Figure 12B:
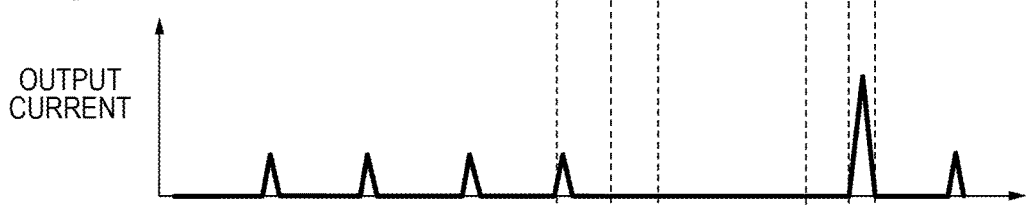
Figure 12C:
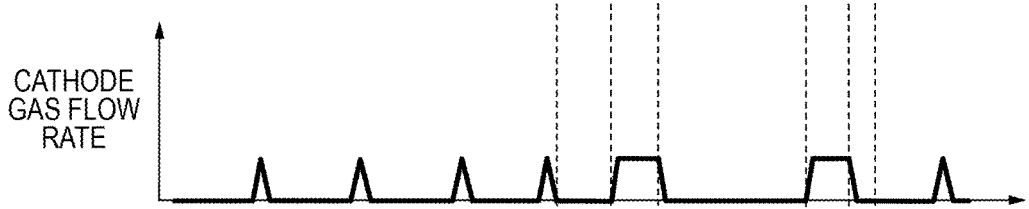
Figure 12D:
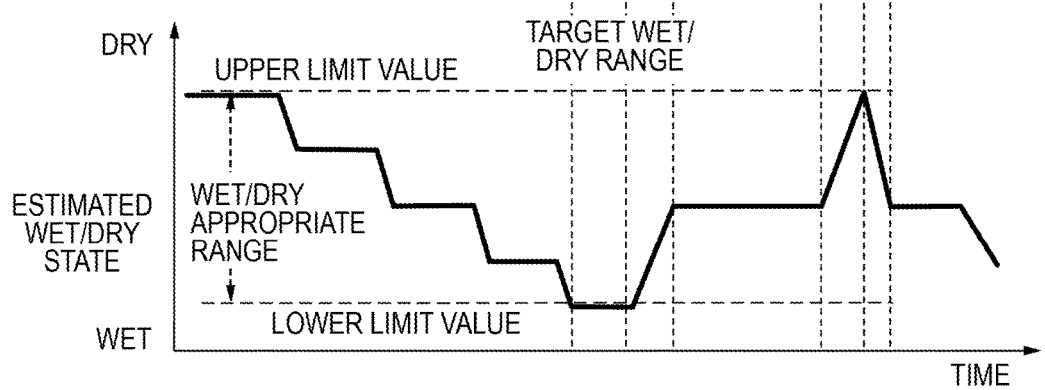
Figure 13A:
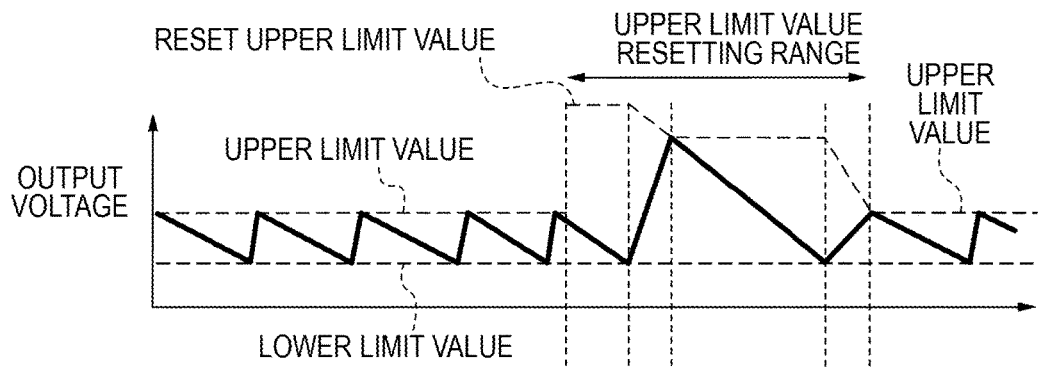
Figure 13B:
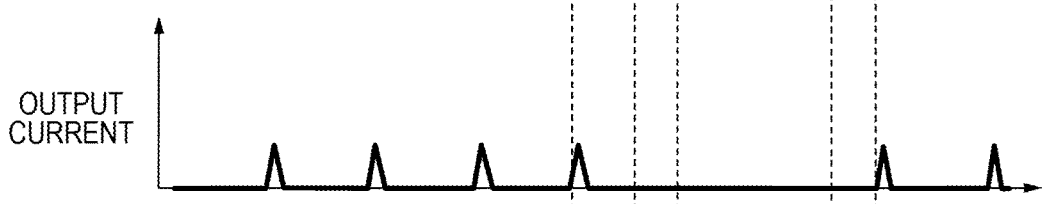
Figure 13C:
Figure 13D:
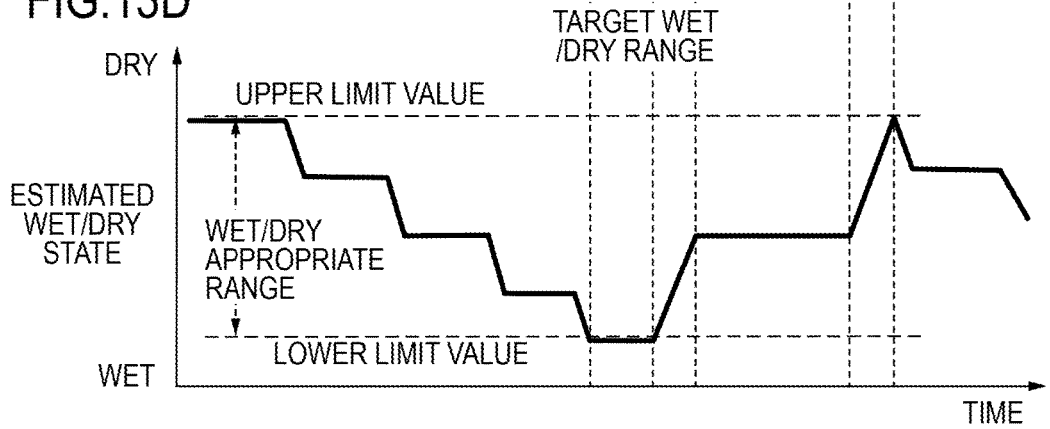

Next, the operation of the fuel cell system 100 of the present embodiment is described using a flow chart shown in FIG. 11. In the present embodiment, only a flow chart of an output voltage upper limit value resetting process different from that of the first embodiment is described. FIG. 11 is a flow chart showing an example of the output voltage upper limit value resetting process executed by the controller 201 in the second embodiment of the present invention. The controller 201 executes this output voltage upper limit value resetting process after setting the upper and lower limit values of the output voltage of the fuel cell stack 1 in Step S12 of the idle stop operation process.

In this output voltage upper limit value resetting process, the wet/dry appropriate range setting unit 240 of the controller 201 first sets the wet/dry appropriate range of the fuel cell stack 1 by reading necessary data from an unillustrated memory or the like (Step S101).

Subsequently, the controller 201 determines whether or not a reset flag stored in the unillustrated memory is ON (Step S201). Here, the "reset flag" is a flag indicating whether or not the upper limit value of the output voltage of the fuel cell stack 1 has been reset by the output voltage upper limit value resetting unit 270. If the reset flag is ON, it indicates that the upper limit value of the output voltage has been reset in the preceding routine. If the reset flag is determined to be ON, the controller 201 proceeds to Step S202 of the process flow.

On the other hand, if the reset flag is determined to be not ON, but OFF, the wet/dry state detection unit 210 of the controller 201 estimates the wet/dry state of the fuel cell stack 1 on the basis of an internal impedance of the fuel cell stack 1 obtained from an impedance measuring device 6 (Step S102).

Then, the wet/dry appropriate range determination unit 260 determines whether or not the wet/dry state of the fuel cell stack 1 estimated in Step S102 is outside the wet/dry appropriate range set in Step S11 (Step S103). If the wet/dry state is determined to be within the wet/dry appropriate range, the controller 201 directly ends this output voltage upper limit value resetting process.

On the other hand, if the wet/dry state is determined to be outside the wet/dry appropriate range, the output voltage upper limit value resetting unit 270 resets to increase the upper limit value of the output voltage set in Step S12 of the idle stop operation process (Step S104). Specifically, the output voltage upper limit value resetting unit 270 obtains open circuit voltage data of the fuel cell stack 1 described using FIG. 4 from the unillustrated memory and sets the upper limit value of the output voltage at a value obtained by adding a predetermined margin to this open circuit voltage.

Further, in the present embodiment, the controller 201 switches the reset flag stored in the unillustrated memory from OFF to ON (Step S104) if the output voltage upper limit value setting unit 270 resets the upper limit value of the output voltage.

Subsequently, the target wet/dry degree setting unit 290 of the controller 201 sets the target wet/dry range or target degree of wetness of the fuel cell stack 1 during the idle stop operation (Step S202). It should be noted that the target wet/dry range or target degree of wetness is assumed to be near the upper limit value of the wet/dry appropriate range in the present embodiment.

Subsequently, the wet/dry appropriate range determination unit 260 of the controller 201 determines whether or not the wet/dry state of the fuel cell stack 1 estimated by the wet/dry state detection unit 210 has reached the target wet/dry range or target degree of wetness (Step S203). If it is determined that the estimated wet/dry state has not reached the target wet/dry range or target degree of wetness, the controller 201 directly ends this output voltage upper limit value resetting process.

On the other hand, if it is determined that the estimated wet/dry state has reached the target wet/dry range or target degree of wetness, the output voltage upper limit value resetting unit 270 returns the reset upper limit value to a normal upper limit value, which is an initial upper limit value, switches the reset flag from ON to OFF (Step S204) and ends this output voltage upper limit value resetting process.

An example of the operation of the fuel cell system 100 in the present embodiment is described below using time charts of FIGS. 12 and 13. First, examples of the time charts are described using FIG. 12. FIG. 12 are examples of the time charts showing a state change of each physical quantity during the idle stop operation in the second embodiment of the present invention. In this example, the reset upper limit value is reduced at once to return to the initial upper limit value. It should be noted that state changes similar to those in the time charts of FIG. 6 in the first embodiment may be omitted.

As in the case shown in FIG. 6, the output voltage is controlled between the upper limit value and the lower limit value during the idle stop operation of the fuel cell system 100. By supplying the cathode gas to the fuel cell stack 1, the output voltage vertically pulsates and an output current of the fuel cell stack 1 is intermittently output at a timing when the output voltage reaches the upper limit value. This causes water to be generated in the fuel cell stack 1 and the wet/dry state of the fuel cell stack 1 to gradually decrease (transition in a wetting direction).

When the wet/dry state reaches the lower limit value of the wet/dry appropriate range, the output voltage upper limit value resetting unit 270 switches the upper limit value of the output voltage to the reset upper limit value. After the upper limit value of the output voltage is reset, the wet/dry state of the fuel cell stack 1 reaches the target wet/dry range set by the target wet/dry degree setting unit 290 by the second supply of the cathode gas at a fixed flow rate for a predetermined time.

The first embodiment is not configured to change the reset upper limit value of the output voltage even if the wet/dry state of the fuel cell stack 1 reaches the upper limit value of the wet/dry appropriate range. On the other hand, in the example of the present embodiment, the target wet/dry range is set and the upper limit value of the output voltage is returned at once from the reset upper limit value to the initial upper limit value if the wet/dry state reaches this target wet/dry range.

At this time, the output voltage of the fuel cell stack 1 falls below the open circuit voltage by a return to the initial upper limit value. Thus, a relatively large output current is generated and a large amount of water is generated. In this way, the wet/dry state of the fuel cell stack 1 makes a large step to transition to the wet side. As just described, in this example, the wet/dry state of the fuel cell stack 1 reaches the target wet/dry range, whereby the wet/dry state transitions to the wet side again.

Next, other examples of the time charts are described using FIG. 13. FIG. 13 are other examples of the time charts showing the state change of each physical quantity during the idle stop operation in the second embodiment of the present invention. In this example, the reset upper limit value is reduced in a stepped manner on the basis of various functions to return to the initial upper limit value.

This example is characterized in that, in the case of resetting the upper limit value of the output voltage in Step S104 of the flow chart of the output voltage upper limit value resetting process shown in FIG. 11, a predetermined processing is applied to the reset upper limit value of the output voltage on the basis of a difference between a wet/dry state actually estimated in Step S102 (hereinafter, also referred to as an "actual wet/dry state") in this routine and the target wet/dry state serving as a control target.

The "predetermined processing" is assumed to be, for example, the execution of a feedback control of the upper limit value of the output voltage on the basis of the difference between the actual wet/dry state and the target wet/dry state, the calculation of the upper limit value of the output voltage as a function of this difference and the upper limit value of the output voltage and the determination of the upper limit value of the output voltage on the basis of a table of this difference and the upper limit value of the output voltage.

In the time charts of FIG. 13, an example is shown in which the reset upper limit value of the output voltage is reduced according to a linear function at a supply timing of the cathode gas. Similarly to the time charts of FIG. 12, if the wet/dry state estimated in Step S102 reaches the lower limit value of the wet/dry appropriate range, the output voltage upper limit value resetting unit 270 sets the upper limit value of the output voltage of the fuel cell stack 1 to a predetermined reset upper limit value equal to or higher than the open circuit voltage. Thereafter, the predetermined reset upper limit value is kept until the output voltage reaches the lower limit value thereof.

If the output voltage reaches the lower limit value, the cathode gas supply control unit 280 drives the compressor 22 to supply the cathode gas to the fuel cell stack 1. As just described, the reset upper limit value is gradually reduced with a predetermined gradient based on the difference between the current wet/dry state and the target wet/dry state if the supply of the cathode gas is started. At this time, since the cathode gas is supplied, the output voltage of the fuel cell stack 1 also increases.

At a timing when these lines intersect in a two-dimensional plane, the cathode gas supply control unit 280 stops the supply of the cathode gas. It should be noted that, in this example, the intersecting upper limit value of the output voltage is assumed to be higher than the open circuit voltage of the fuel cell stack 1. Thus, no water is generated by the I-V characteristic of the fuel cell stack 1.

As in the case of resetting the upper limit value of the output voltage, the reset upper limit value is kept at the upper limit value of the output voltage at this intersecting timing again until the next supply timing of the cathode gas. When the output voltage reaches the lower limit value thereof, the cathode gas supply control unit 280 drives the compressor 22 to supply the cathode gas to the fuel cell stack 1. The cathode gas supply control unit 280 stops the supply of the cathode gas at a timing when the increasing output voltage and the decreasing reset upper limit value intersect in the two-dimensional plane.

In this example, the upper limit value of the output voltage is switched from the reset upper limit value to the initial upper limit value at this intersecting timing. Further, since the upper limit value of the output voltage at the second intersecting timing is lower than the open circuit voltage, the output current is output and water is generated. In this way, the wet/dry state of the fuel cell stack 1 somewhat transitions to the wet side.

As described above, the fuel cell system 100 of the present embodiment further includes the target wet/dry degree setting unit 290 configured to set the target degree of wetness or target wet/dry range of the fuel cell stack 1 during the idle stop operation in addition to the configuration of the fuel cell system 100 in the above first embodiment. The output voltage upper limit value resetting unit 270 is configured to return the reset upper limit value of the output voltage of the fuel cell stack 1 to the upper limit value before resetting on the basis of the wet/dry state of the fuel cell stack 1 detected by the wet/dry state detection unit 210 and the target degree of wetness or target wet/dry range set by the target wet/dry degree setting unit 290. In the present embodiment, by configuring the fuel cell system 100 as just described, the reset upper limit value of the output voltage of the fuel cell stack 1 is returned to the initial upper limit value when the wet/dry state of the fuel cell stack 1 enters the target wet/dry range or reaches the target degree of wetness during the idle stop operation. In this way, a time during which each electrode (anode electrode and cathode electrode) of the fuel cell stack 1 is exposed to high potential can be shortened, wherefore deterioration due to high potential of the electrolyte membranes of the fuel cells and the like can be effectively suppressed.

Thus, according to the fuel cell system 100 of the present embodiment, the life of each electrode and each electrolyte membrane of the fuel cell stack 1 can be extended in addition to the effects achieved by the fuel cell system 100 of the first embodiment.

Further, a control method for the fuel cell system 100 of the present embodiment further includes, in addition to each step of the control method of the above first embodiment, a step of setting the target degree of wetness or target wet/dry range of the fuel cell stack 1 during the idle stop operation and a step of returning the reset upper and lower limit values of the output voltage of the fuel cell stack 1 to the upper and lower limit values before resetting on the basis of the set target degree of wetness or target wet/dry range. By configuring the control method for the fuel cell system 100 of the present embodiment as just described, the time during which each electrode (anode electrode and cathode electrode) of the fuel cell stack 1 is exposed to high potential can be shortened in addition to the effects achieved by the control method for the fuel cell system 100 of the first embodiment, wherefore deterioration due to high potential of the electrolyte membranes of the fuel cells and the like can be effectively suppressed. It should be noted that since the lower limit value needs not be changed (returned to the initial lower limit value) if only the upper limit value of the output voltage is reset, only the upper limit value may be returned to the upper limit value before resetting.

Third Embodiment

A third embodiment of the present invention is described mainly on points of difference from the second embodiment below. It should be noted that since an overall configuration of a fuel cell system 100 is substantially similar to that of the first embodiment, the overall configuration of the system is described using FIG. 1 and not described in detail here. Further, in the present embodiment, parts performing functions similar to those of the above first embodiment are denoted by the same reference signs and repeated description is omitted as appropriate.

In the above second embodiment, when the reset upper limit value of the output voltage of the fuel cell stack 1 is returned to the initial upper limit value, the upper limit value is returned from the reset upper limit value to the initial upper limit value at once or the predetermined processing is applied to the reset upper limit value of the output voltage on the basis of the difference between the actual wet/dry state and the target wet/dry state. The third embodiment differs from the second embodiment in that a reset upper limit value is returned to an initial upper limit value when an output voltage of a fuel cell stack 1 decreases to the initial upper limit value after a wet/dry state of the fuel cell stack 1 reaches a target wet/dry range instead of making such a sudden change or applying a cumbersome processing.

It should be noted that functions of a controller 201 of the present embodiment are substantially similar to those of the controller 201 of the second embodiment. Thus, in the following description, the operation of the fuel cell system 100 of the present embodiment is described using the functional block diagram of FIG. 10.

Figure 14:
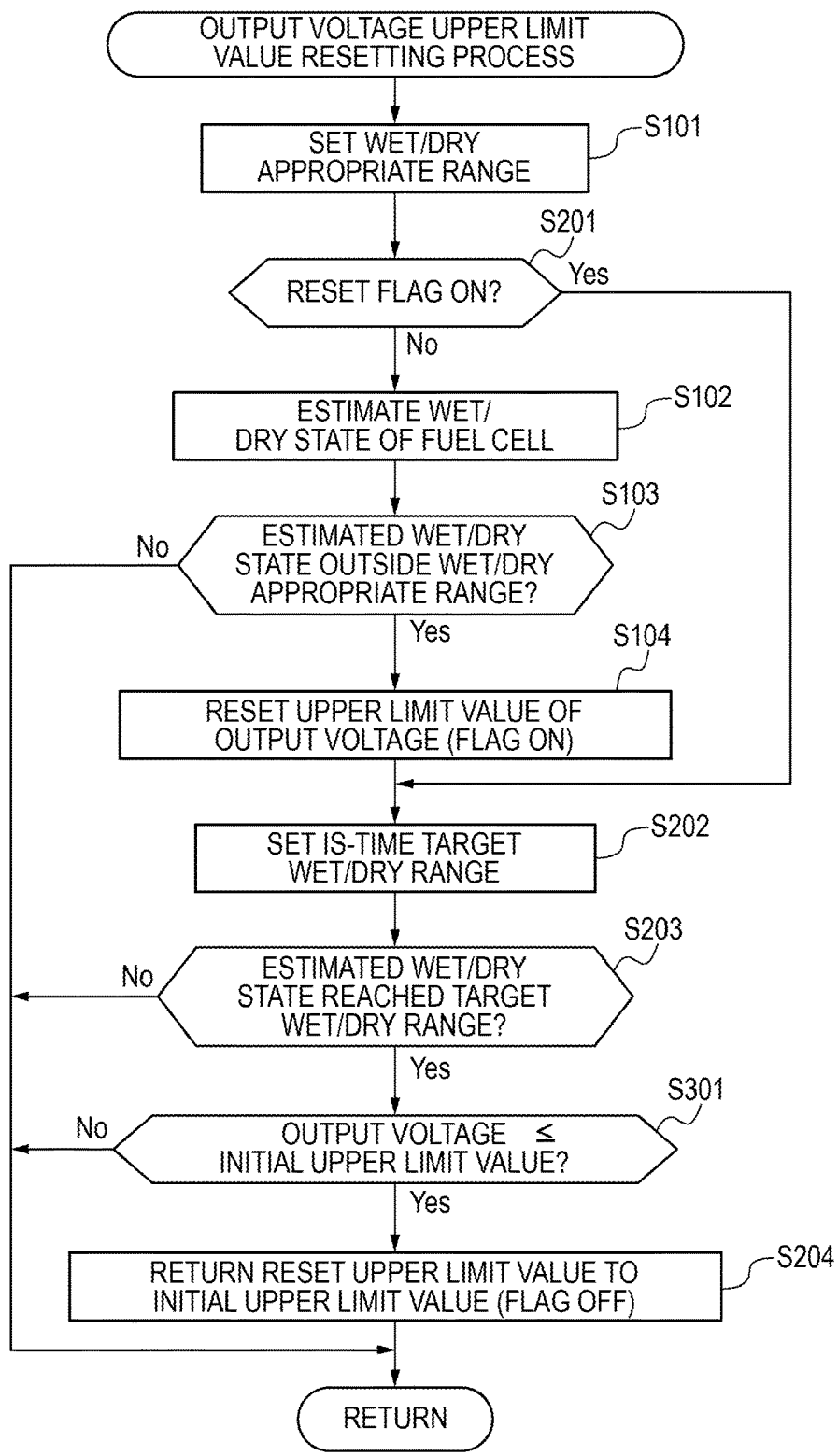
FIG. 14 is a flow chart showing an example of an output voltage upper limit value resetting process executed by a controller in a third embodiment of the present invention, FIG. 15 are time charts showing a state change of each physical quantity during an idle stop operation process in the third embodiment of the present invention.

First, the operation of the fuel cell system 100 of the present embodiment is described using a flow chart of FIG. 14. In the present embodiment, only a flow chart of an output voltage upper limit value resetting process different from that of the second embodiment is described. FIG. 14 is a flow chart showing an example of the output voltage upper limit value resetting process executed by the controller 201 in the third embodiment of the present invention. The controller 201 executes this output voltage upper limit value resetting process when upper and lower limit values of the output voltage of the fuel cell stack 1 are set in Step S12 of the idle stop operation process.

In this output voltage upper limit value resetting process, a wet/dry appropriate range setting unit 240 of the controller 201 first sets a wet/dry appropriate range of the fuel cell stack 1 by reading necessary data from an unillustrated memory or the like (Step S101).

Subsequently, the controller 201 determines whether or not a reset flag stored in the unillustrated memory is ON (Step S201). If the reset flag is ON, it indicates that the upper limit value of the output voltage has been reset in the preceding routine. If the reset flag is determined to be ON, the controller 201 proceeds to Step S202 of the process flow.

On the other hand, if the reset flag is determined to be not ON, but OFF, a wet/dry state detection unit 210 of the controller 201 estimates the wet/dry state of the fuel cell stack 1 on the basis of an internal impedance of the fuel cell stack 1 obtained from an impedance measuring device 6 (Step S102).

Then, a wet/dry appropriate range determination unit 260 determines whether or not the wet/dry state of the fuel cell stack 1 estimated in Step S102 is outside the wet/dry appropriate range set in Step S11 (Step S103). If the wet/dry state is determined to be within the wet/dry appropriate range, the controller 201 directly ends this output voltage upper limit value resetting process.

On the other hand, if the wet/dry state is determined to be outside the wet/dry appropriate range, an output voltage upper limit value resetting unit 270 resets to increase the upper limit value of the output voltage set in Step S12 of the idle stop operation process (Step S104). Specifically, the output voltage upper limit value resetting unit 270 obtains open circuit voltage data of the fuel cell stack 1 described using FIG. 4 from the unillustrated memory and sets the upper limit value of the output voltage at a value obtained by adding a predetermined margin to this open circuit voltage.

Further, in the present embodiment, if the output voltage upper limit value resetting unit 270 resets the upper limit value of the output voltage, the controller 201 switches the reset flag stored in the unillustrated memory from OFF to ON (Step S104).

Subsequently, a target wet/dry degree setting unit 290 of the controller 201 sets the target wet/dry range or target degree of wetness of the fuel cell stack 1 during the idle stop operation (Step S202). It should be noted that the target wet/dry range or target degree of wetness is assumed to be near the upper limit value of the wet/dry appropriate range in the present embodiment.

Subsequently, the wet/dry appropriate range determination unit 260 of the controller 201 determines whether or not the wet/dry state of the fuel cell stack 1 estimated by the wet/dry state detection unit 210 has reached the target wet/dry range or target degree of wetness (Step S203). If it is determined that the estimated wet/dry state has not reached the target wet/dry range or target degree of wetness, the controller 201 directly ends this output voltage upper limit value resetting process.

On the other hand, if it is determined that the estimated wet/dry state has reached the target wet/dry range or target degree of wetness, an output voltage determination unit 250 determines whether or not the current output voltage detected by a voltage sensor 52 has dropped to or below the initial upper limit value of the output voltage before resetting (Step S301). If the current output voltage is determined to be higher than the initial upper limit value, the controller 201 directly ends this output voltage upper limit value resetting process.

Further, if the current output voltage is determined to be equal to or lower than the initial upper limit value, the output voltage upper limit value resetting unit 270 returns the reset upper limit value to a normal upper limit value, which is an initial upper limit value, switches the reset flag from ON to OFF (Step S204) and ends this output voltage upper limit value resetting process.

An example of the operation of the fuel cell system 100 in the present embodiment is described below using time charts of FIG. 15. FIG. 15 are time charts showing a state change of each physical quantity during the idle stop operation in the third embodiment of the present invention. In this example, the upper limit value of the output voltage is returned to the initial upper limit value when the output voltage first reaches the initial upper limit value after the wet/dry state reaches the target wet/dry range. It should be noted that state changes similar to those in the time charts of FIG. 6 in the first embodiment may be omitted.

This example is characterized in that, when the reset upper limit value of the output voltage is returned to the initial upper limit value in Steps S301, S204 of the flow chart of the output voltage upper limit value resetting process shown in FIG. 14, that return timing is determined on the basis of the current output voltage and the initial upper limit value.

In the time charts of FIG. 15, an output current of the fuel cell stack 1 is intermittently output as in the above first and second embodiments, whereby water is generated in the fuel cell stack 1 and the wet/dry state of the fuel cell stack 1 gradually decreases (transitions in a wetting direction). When the wet/dry state of the fuel cell stack 1 estimated by the wet/dry state detection unit 210 reaches the lower limit value of the wet/dry appropriate range, the output voltage upper limit value resetting unit 270 sets the upper limit value of the output voltage of the fuel cell stack 1 to a predetermined reset upper limit value equal to or higher than the open circuit voltage.

When the output voltage of the fuel cell stack 1 reaches the lower limit value after the upper limit value of the output voltage is set to the reset upper limit value, a cathode gas supply control unit 280 supplies cathode gas to the fuel cell stack 1 at a predetermined maximum flow rate. At this time, since the reset upper limit value of the output voltage is higher than the open circuit voltage of the fuel cell stack 1, no output current is generated and the fuel cell stack 1 can be suddenly dried.

Thereafter, when it is determined that the wet/dry state estimated by the wet/dry state detection unit 210 has reached the target wet/dry range by the second supply of the cathode gas, the output voltage determination unit 250 further determines whether or not the output voltage of the fuel cell stack 1 detected by the voltage sensor 52 has dropped to or below the initial upper limit value (Step S301).

If the output voltage is determined to have dropped to or below the initial upper limit value, the output voltage upper limit value resetting unit 270 sets the upper limit value of the output voltage to the initial upper limit value from the reset upper limit value (Step S204). Thereafter, the cathode gas supply control unit 280 intermittently supplies the cathode gas to the fuel cell stack 1 with the output voltage set at a value between the initial upper limit value and the lower limit value.

Since the upper limit value of the output voltage can be kept at the reset upper limit value for a longer time in the present embodiment as compared to the second embodiment, an excess output voltage is not extracted while the reset upper limit value is set even if the cathode gas supply control unit 280 supplies the cathode gas to the fuel cell stack 1. In this way, the wet/dry state of the fuel cell stack 1 is kept near the target wet/dry range for a longer time.

As described above, as against the control method for the fuel cell system 100 of the second embodiment, a control method for the fuel cell system 100 of the present embodiment is configured to return the reset upper limit value of the fuel cell stack 1 to the upper limit value before resetting after the output voltage of the fuel cell stack 1 drops to or below the upper limit value of the output voltage before resetting (initial upper limit value) in the upper limit value returning step if the detected wet/dry state of the fuel cell stack 1 is drier than at the set target degree of wetness or in the target wet/dry range (or has reached the vicinity of the target degree of wetness or target wet/dry range).

By configuring the control method for the fuel cell system 100 as just described, even if the set wet/dry state reaches the target wet/dry range, the reset upper limit value is not returned to the initial upper limit value until the output voltage of the fuel cell stack 1 falls below the initial upper limit value. Thus, the consumption of the output current generated by returning the upper limit value of the output voltage to the initial upper limit value is suppressed and the generation of water is also suppressed. In this way, the wet/dry state of the fuel cell stack 1 can be kept within the target wet/dry range (wet/dry appropriate range) for a longer time.

Thus, according to the control method for the fuel cell system 100 of the present embodiment, a duration of time during which the wet/dry state of the fuel cell stack 1 during the idle stop operation is kept within the wet/dry appropriate range can be improved as compared to the first and second embodiments. In this way, the generation of water during the idle stop operation can be suppressed and the extraction of the output current can be suppressed, wherefore fuel consumption of a fuel cell vehicle can be improved.

Fourth Embodiment

A fourth embodiment of the present invention is described mainly on points of difference from the first embodiment below. It should be noted that since an overall configuration of a fuel cell system 100 is substantially similar to that of the first embodiment, the overall configuration of the system is described using FIG. 1 and not described in detail here. Further, in the present embodiment, parts performing functions similar to those of the above first embodiment are denoted by the same reference signs and repeated description is omitted as appropriate.

In the above first to third embodiments, the supply amount of the cathode gas set by the cathode gas supply control unit 280 is controlled to be equal to or less than the predetermined amount according to the upper limit value during intermittent supply. The present embodiment differs from the first to third embodiments in that, when a wet/dry state of a fuel cell stack 1 estimated by a wet/dry state detection unit 210 falls below a lower limit value of a wet/dry appropriate range, a supply flow rate and a supply time of cathode gas are determined on the basis of a deviation between the estimated wet/dry state and a target wet/dry range.

It should be noted that functions of a controller 201 of the present embodiment are substantially similar to those of the controller 201 of the second embodiment. Thus, in the following description, the operation of the fuel cell system 100 of the present embodiment is described using the functional block diagram of FIG. 10.

Figure 16:
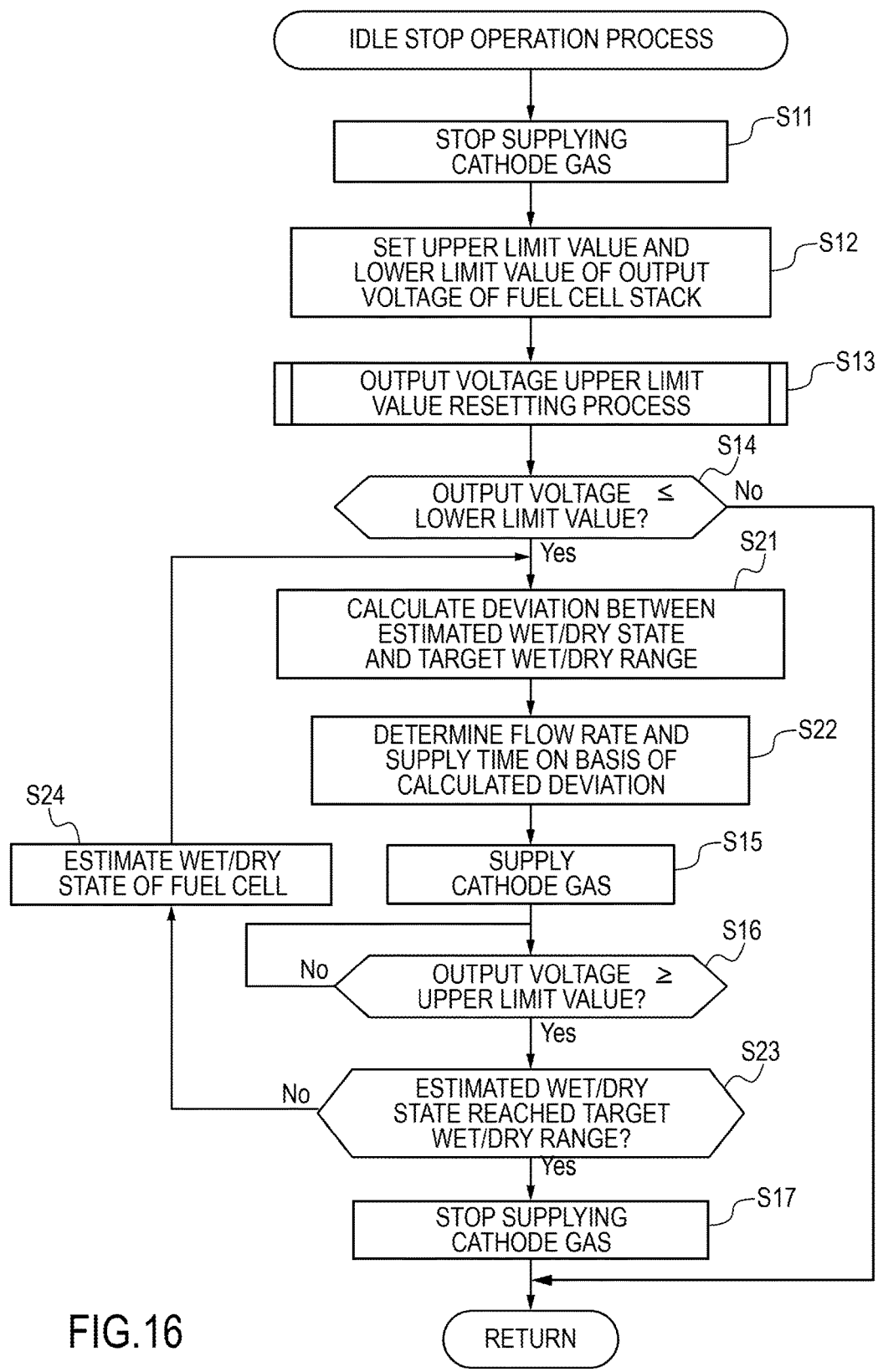
FIG. 16 is a flow chart showing an example of an idle stop operation process executed by a controller in a fourth embodiment of the present invention, FIG. 17 are time charts showing a state change of each physical quantity during the idle stop operation process in the fourth embodiment of the present invention.

First, the operation of the fuel cell system 100 of the present embodiment is described using a flow chart shown in FIG. 16. In the present embodiment, only a flow chart of an idle stop operation process different from that of the first embodiment is described. FIG. 16 is a flow chart showing an example of the idle stop operation process executed by the controller 201 in the fourth embodiment of the present invention. The controller 201 executes this idle stop operation process if it is determined in Step S1 of the idle stop determination process shown in FIG. 7 that an idle stop start condition has been satisfied.

In this idle stop operation process, a cathode gas supply control unit 280 of the controller 201 first stops a compressor 22 to stop the supply of the cathode gas (Step S11). An output voltage upper/lower limit value setting unit 230 sets upper and lower limit values of an output voltage of the fuel cell stack 1 during an idle stop operation (Step S12). Then, an output voltage upper limit value resetting unit 270 executes an output voltage upper limit value resetting process (Step S13).

Subsequently, an output voltage determination unit 250 determines whether or not the output voltage of the fuel cell stack 1 detected by a voltage sensor 52 has dropped to or below the lower limit value set in Step S12 (Step S14). If the output voltage is determined to be larger than the lower limit value, the controller 201 directly ends this idle stop operation process. Thereafter, the controller 201 executes this idle stop operation process until it is determined in Step S3 of the idle stop determination process that an idle stop end condition has been satisfied.

On the other hand, if the output voltage is determined to be equal to or lower than the lower limit value, the controller 201 (may also be a wet/dry appropriate range determination unit 260) compares the current wet/dry state estimated by the wet/dry state detection unit 210 and a target wet/dry range set in Step S202 of the output voltage upper limit value resetting process and calculates a deviation between the current wet/dry state and the target wet/dry range (Step S21).

Then, the controller 201 determines the flow rate and the supply time of the cathode gas to be supplied to the fuel cell stack 1 on the basis of the calculated deviation (Step S22). The cathode gas supply control unit 280 drives the compressor 22 to supply the cathode gas to the fuel cell stack 1 on the basis of the determined flow rate and supply time of the cathode gas (Step S15).

Subsequently, the output voltage determination unit 250 determines whether or not the output voltage of the fuel cell stack 1 detected by the voltage sensor 52 has increased to or above the upper limit value set in Step S12 or the upper limit value reset in Step S104 of an output voltage upper limit value resetting process (Step S16). If the output voltage is determined to be below the upper limit value, the controller 201 waits in this Step S16 until the output voltage increases to or above the upper limit value.

On the other hand, if the output voltage is determined to be equal to or higher than the upper limit value, the wet/dry appropriate range determination unit 260 determines whether or not the wet/dry state estimated by the wet/dry state detection unit 210 has reached the target wet/dry range (Step S23). If it is determined that the estimated wet/dry state has reached the target wet/dry range, the cathode gas supply control unit 280 stops the compressor 22 to stop the supply of the cathode gas to the fuel cell stack 1 (Step S17) and ends this idle stop operation process.

If it is determined that the estimated wet/dry state has not reached the target wet/dry state, the wet/dry state detection unit 210 estimates the wet/dry state of the fuel cell stack 1 again (Step S24) and repeats processings of Steps S21 to S24 until the estimated wet/dry state reaches the target wet/dry range.

An example of the operation of the fuel cell system 100 in the present embodiment is described below using time charts of FIG. 17. FIG. 17 are time charts showing a state change of each physical quantity during the idle stop operation in the fourth embodiment of the present invention. In this example, a case is described where the target wet/dry range is reached promptly by suddenly supplying the cathode gas to the fuel cell stack 1 after the estimated wet/dry state reaches the target wet/dry range. It should be noted that state changes similar to those in the time charts of FIG. 6 in the first embodiment may be omitted.

This example is characterized in that the supply flow rate and supply time of the cathode gas are determined on the basis of the deviation between the estimated wet/dry state and the target wet/dry range (Steps S21, S22) and the cathode gas is supplied to the fuel cell stack 1 on the basis of the determined supply flow rate and supply time if it is determined that the wet/dry state of the fuel cell stack 1 has reached the lower limit value of the wet/dry appropriate range.

Figure 17A:
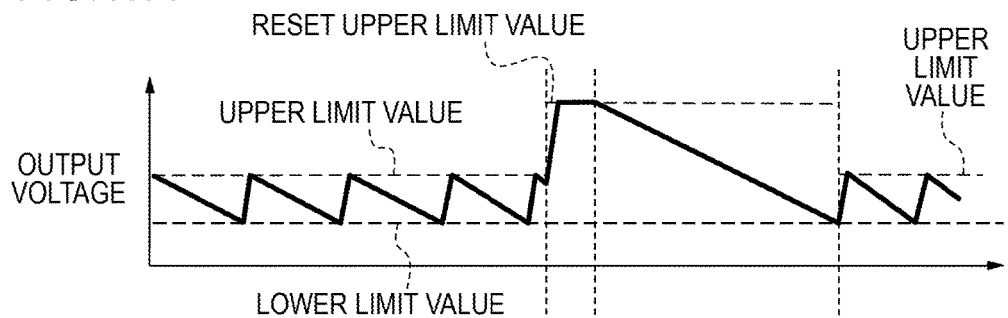
Figure 17B:
Figure 17C:
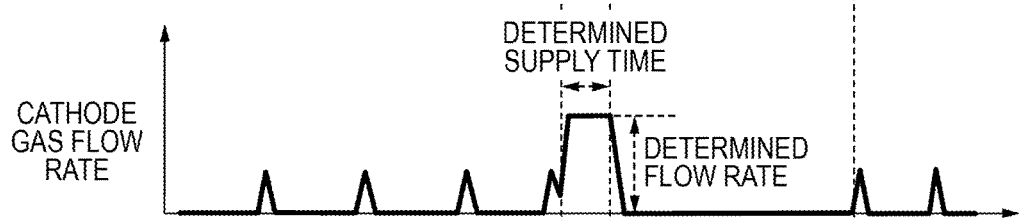
Figure 17D:
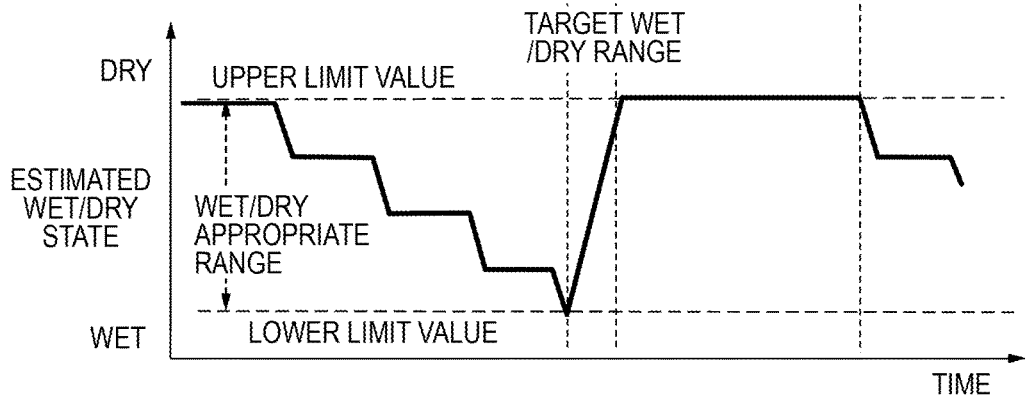

In the time charts of FIG. 17, the controller 201 determines the flow rate and supply time of the cathode gas to be supplied to the fuel cell stack 1 on the basis of the deviation calculated from the wet/dry state and the target wet/dry range (Step S21 S22) if the wet/dry state of the fuel cell stack 1 estimated by the wet/dry state detection unit 210 reaches the lower limit value of the wet/dry appropriate range (see FIG. 17D).

The cathode gas supply control unit 280 supplies the cathode gas to the fuel cell stack 1 on the basis of the supply flow rate and supply time of the cathode gas determined in this way (see FIG. 17C). Since the output voltage of the fuel cell stack 1 reaches the reset upper limit value in this way (see FIG. 17A), energy by an excess electrochemical reaction of supplied oxygen and residual hydrogen is extracted as an output current (see FIG. 17B).

When the supply of the cathode gas is finished, the wet/dry state of the fuel cell stack 1 reaches the target wet/dry range. Then, the output voltage of the fuel cell stack 1 gradually decreases. In the present embodiment, it is not specifically described that the upper limit value of the output voltage is switched from the reset upper limit value to the initial upper limit value. However, as shown in FIG. 17, the output voltage upper limit value resetting unit 270 may switch the upper limit value of the output voltage from the reset upper limit value to the initial upper limit value, for example, when the output voltage of the fuel cell stack 1 reaches the lower limit value after the wet/dry state reaches the target wet/dry range.

As described above, as against the control method for the fuel cell system 100 in the above second embodiment, a control method for the fuel cell system 100 of the present embodiment is configured such that the flow rate and supply time of the cathode gas to be supplied are determined on the basis of the detected wet/dry state of the fuel cell stack 1 and the set target degree of wetness or target wet/dry range and the cathode gas is (intermittently) supplied to the fuel cell stack 1 on the basis of the determined cathode gas flow rate and supply time in the cathode gas supplying step if the cathode gas is intermittently supplied with the output voltage set at a value between the reset upper limit value and the reset lower limit value (lower limit value may not be reset).

According to the control method for the fuel cell system 100 of the present embodiment, the cathode gas is supplied to reach the target wet/dry range at once when the estimated wet/dry state reaches the lower limit value of the wet/dry appropriate range. Thus, the wet/dry state in the fuel cell stack 1 can be transitioned to the target wet/dry range promptly. In this way, the wet/dry state in the fuel cell stack 1 during the idle stop operation can be quickly made proper.

Fifth Embodiment

A fifth embodiment of the present invention is described mainly on points of difference from the second embodiment below. It should be noted that since an overall configuration of a fuel cell system 100 is substantially similar to that of the first embodiment, the overall configuration of the system is described using FIG. 1 and not described in detail here. Further, in the present embodiment, parts performing functions similar to those of the above first embodiment are denoted by the same reference signs and repeated description is omitted as appropriate.

In the above fourth embodiment, when the wet/dry state of the fuel cell stack 1 estimated by the wet/dry state detection unit 210 falls below the lower limit value of the wet/dry appropriate range, the supply flow rate and supply time of the cathode gas are determined on the basis of the deviation between the estimated wet/dry state and the target wet/dry range and the cathode gas supply control unit 280 supplies the cathode gas to the fuel cell stack 1 on the basis of the determined supply flow rate and supply time of the cathode gas. The present embodiment differs from the fourth embodiment in that, when a wet/dry state of a fuel cell stack 1 estimated by a wet/dry state detection unit 210 falls below a lower limit value of a wet/dry appropriate range, a water balance in the fuel cell stack 1 is calculated and an upper limit value of an output voltage is reset and a cathode gas supply flow rate is determined on the basis of this calculated water balance.

It should be noted that functions of a controller 201 of the present embodiment are substantially similar to those of the controller 201 of the second embodiment. Thus, in the following description, the operation of the fuel cell system 100 of the present embodiment is described using the functional block diagram of FIG. 10.

Figure 18:
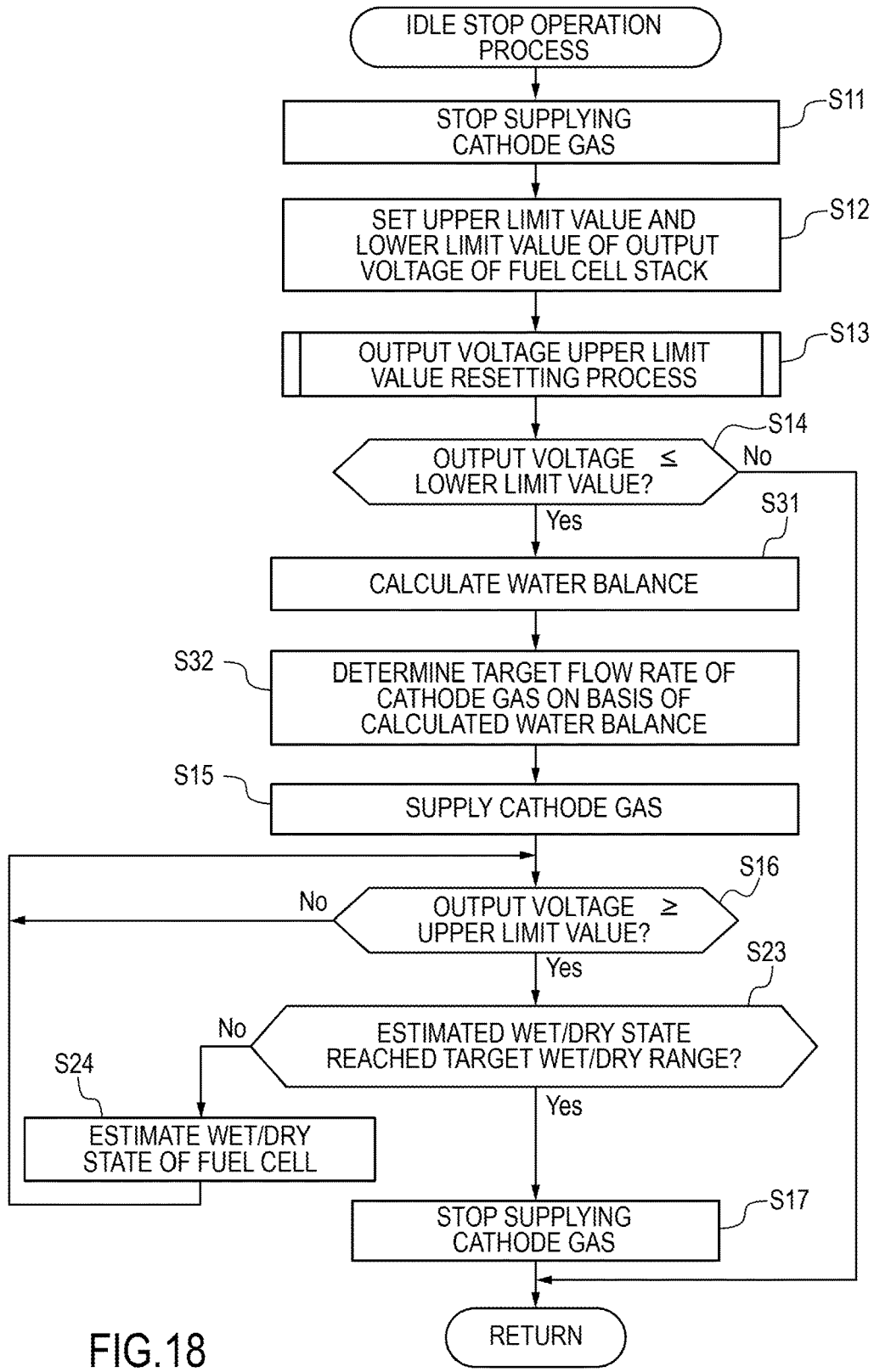
FIG. 18 is a flow chart showing an example of an idle stop operation process executed by a controller in a fifth embodiment of the present invention.
Figure 19:
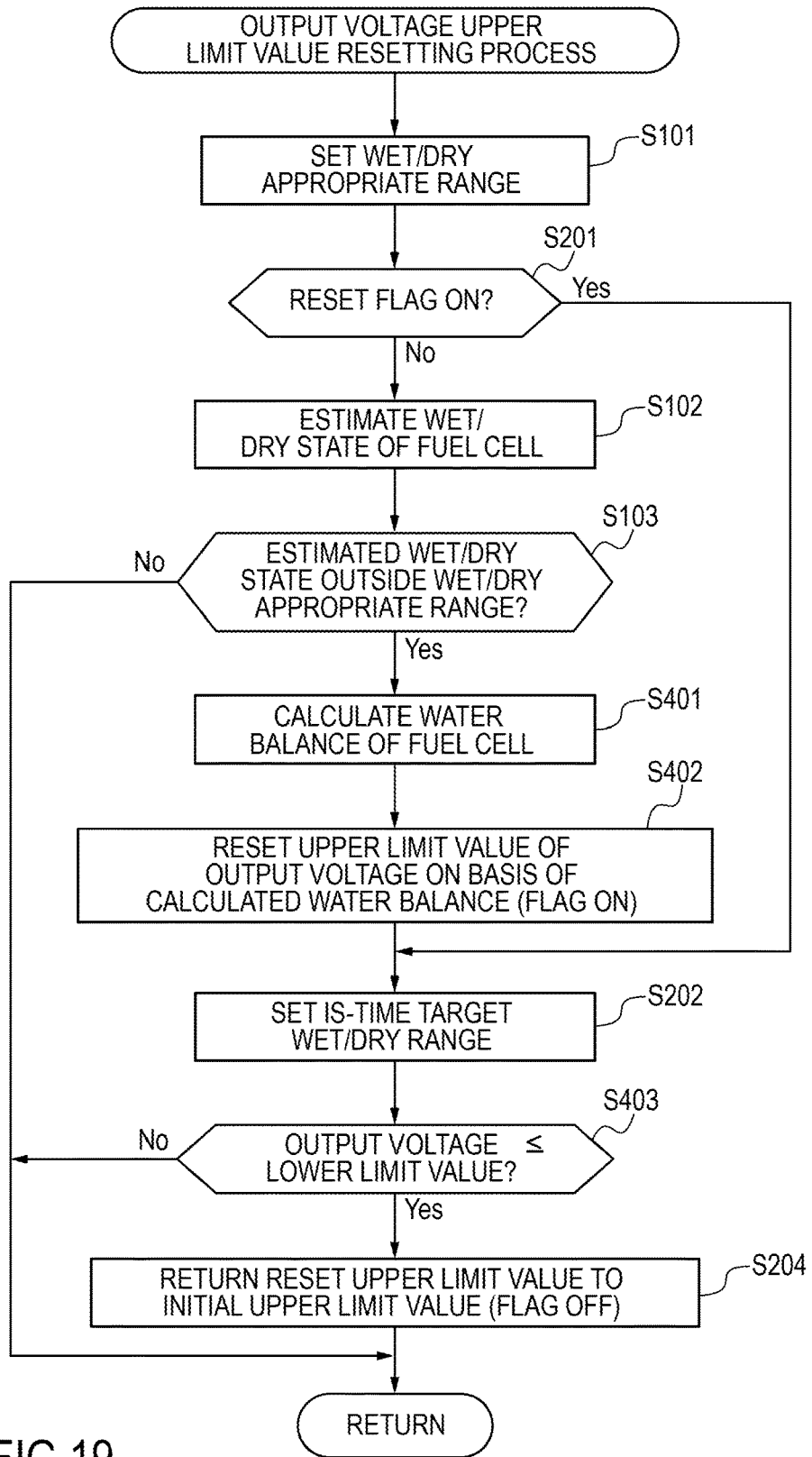
FIG. 19 is a flow chart showing an example of an output voltage upper limit value resetting process as a subroutine of the idle stop operation process of FIG. 18, FIG. 20 are time charts showing a state change of each physical quantity during the idle stop operation process in the fifth embodiment of the present invention.

First, the operation of the fuel cell system 100 of the present embodiment is described using flow charts of FIGS. 18 and 19. FIG. 18 is a flow chart showing an example of an idle stop operation process executed by the controller 201 in the fifth embodiment of the present invention. The controller 201 executes this idle stop operation process when it is determined in Step S1 of the idle stop determination process shown in FIG. 7 that an idle stop start condition has been satisfied.

In this idle stop operation process, a cathode gas supply control unit 280 of the controller 201 first stops a compressor 22 to stop the supply of cathode gas (Step S11). An output voltage upper/lower limit value setting unit 230 sets upper and lower limit values of an output voltage of the fuel cell stack 1 during the idle stop operation (Step S12). Then, an output voltage upper limit value resetting unit 270 executes an output voltage upper limit value resetting process (Step S13).

Subsequently, an output voltage determination unit 250 determines whether or not the output voltage of the fuel cell stack 1 detected by a voltage sensor 52 has dropped to or below the lower limit value set in Step S12 (Step S14). If the output voltage is determined to be larger than the lower limit value, the controller 201 directly ends this idle stop operation process. Thereafter, the controller 201 executes this idle stop operation process until it is determined in Step S3 of the idle stop determination process that an idle stop end condition has been satisfied.

On the other hand, if the output voltage is determined to be equal to or lower than the lower limit value, the controller 201 calculates the water balance in the fuel cell stack 1 on the basis of the amount of water generated by an electrochemical reaction, the amount of generated water contained in cathode off-gas and discharged from the fuel cell stack 1 and the like (Step S31). It should be noted that the water balance of the fuel cell stack 1 may also be determined, for example, using a predetermined map or the like without limitation to such a calculation.

Then, the controller 201 determines a target flow rate of the cathode gas to be supplied to the fuel cell stack 1 on the basis of the calculated water balance (Step S32). The cathode gas supply control unit 280 drives the compressor 22 on the basis of the determined target flow rate of the cathode gas to supply the cathode gas to the fuel cell stack 1 (Step S15).

Subsequently, the output voltage determination unit 250 determines whether or not the output voltage of the fuel cell stack 1 detected by the voltage sensor 52 has increased to or above the upper limit value set in Step S12 or the upper limit value reset in Step S402 of an output voltage upper limit value resetting process to be described later (Step S16). If the output voltage is determined to be below the upper limit value, the controller 201 waits in this Step S16 until the output voltage increases to or above the upper limit value.

On the other hand, if the output voltage is determined to be equal to or above any one of the set upper limit values, a wet/dry appropriate range determination unit 260 determines whether or not the wet/dry state estimated by the wet/dry determination unit 210 has reached the target wet/dry range (Step S23). If it is determined that the estimated wet/dry state has reached the target wet/dry range, the cathode gas supply control unit 280 stops the compressor 22 to stop the supply of the cathode gas to the fuel cell stack 1 (Step S17) and ends this idle stop operation process.

If it is determined that the estimated wet/dry state has not reached the target wet/dry state, the wet/dry state detection unit 210 estimates the wet/dry state of the fuel cell stack 1 again (Step S24) and repeats processings of Steps S16, S23 and S24 until the estimated wet/dry state reaches the target wet/dry range.

FIG. 19 is a flow chart showing an example of the output voltage upper limit value resetting process as a subroutine of the idle stop determination process of FIG. 18. The controller 201 executes this output voltage upper limit value resetting process when setting the upper and lower limit values of the output voltage of the fuel cell stack 1 in Step S12 of the idle stop operation process.

In this output voltage upper limit value resetting process, a wet/dry appropriate range setting unit 240 of the controller 201 first sets the wet/dry appropriate range of the fuel cell stack 1 by reading necessary data from the unillustrated memory or the like (Step S101).

Subsequently, the controller 201 determines whether or not a reset flag stored in the unillustrated memory is ON (Step S201). If the reset flag is ON, it indicates that the upper limit value of the output voltage has been reset in the preceding routine. If the reset flag is determined to be ON, the controller 201 proceeds to Step S202 of the process flow.

On the other hand, if the reset flag is determined to be not ON, but OFF, the wet/dry state detection unit 210 of the controller 201 estimates the wet/dry state of the fuel cell stack 1 on the basis of an internal impedance of the fuel cell stack 1 obtained from an impedance measuring device 6 (Step S102).

Then, the wet/dry appropriate range determination unit 260 determines whether or not the wet/dry state of the fuel cell stack 1 estimated in Step S102 is outside the wet/dry appropriate range set in Step S11 (Step S103). If the estimated wet/dry state is determined to be within the wet/dry appropriate range, the controller 201 directly ends this output voltage upper limit value resetting process.

On the other hand, if the estimated wet/dry state is determined to be outside the wet/dry appropriate range, the controller 201 calculates the water balance in the fuel cell stack 1 on the basis of the amount of water generated by an electrochemical reaction or the amount of generated water contained in cathode off-gas and discharged from the fuel cell stack 1 (Step S401).

Then, the output voltage upper limit value resetting unit 270 resets to increase the upper limit value of the output voltage set in Step S12 of the idle stop operation process on the basis of the calculated water balance (Step S402). Specifically, the output voltage upper limit value resetting unit 270 sets the reset upper limit value on the basis of a flow rate of the cathode gas and the like necessary to transition the water balance of the fuel cell stack 1 to a dry side.

Further, in the present embodiment, if the output voltage upper limit value resetting unit 270 resets the upper limit value of the output voltage, the controller 201 switches the reset flag stored in the unillustrated memory from OFF to ON (Step S104).

Subsequently, a target wet/dry degree setting unit 290 of the controller 201 sets the target wet/dry range or target degree of wetness of the fuel cell stack 1 during the idle stop operation (Step S202). It should be noted that the target wet/dry range or target degree of wetness is assumed to be near the upper limit value of the wet/dry appropriate range.

Subsequently, the output voltage determination unit 250 of the controller 201 determines whether or not the output voltage of the fuel cell stack 1 has dropped to or below the lower limit value (Step S403). If the output voltage is determined to be larger than the lower limit value, the controller 201 directly ends this output voltage upper limit value resetting process.

On the other hand, if the output voltage is determined to have dropped to or below the lower limit value, the output voltage upper limit value resetting unit 270 returns the reset upper limit value to the normal upper limit value, which is the initial upper limit value, switches the reset flag from ON to OFF (Step S204) and ends this output voltage upper limit value resetting process.

An example of the operation of the fuel cell system 100 in the present embodiment is described below using time charts of FIG. 20. FIG. 20 are time charts showing a state change of each physical quantity during the idle stop operation in the fifth embodiment of the present invention. In this example, a case is described where the water balance of the fuel cell stack 1 is calculated and the cathode gas is supplied to the fuel cell stack 1 on the basis of the calculated water balance. It should be noted that state changes similar to those in the time charts of FIG. 6 in the first embodiment may be omitted.

This example is characterized in that the controller 201 calculates the water balance of the fuel cell stack 1 and determines a reset value of the upper limit value (or upper and lower limit values) of the output voltage and the supply flow rate of the cathode gas on the basis of the calculated water balance if it is determined that the wet/dry state of the fuel cell stack 1 has dropped to or below the lower limit value of the wet/dry appropriate range.

Figure 20A:
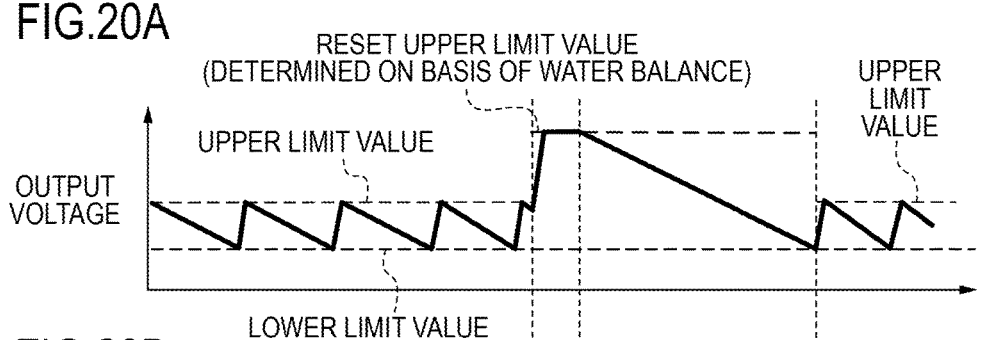
Figure 20B:
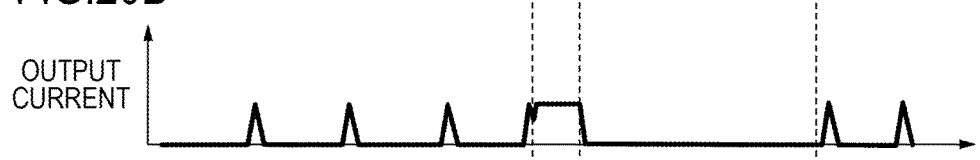
Figure 20C:
Figure 20D:
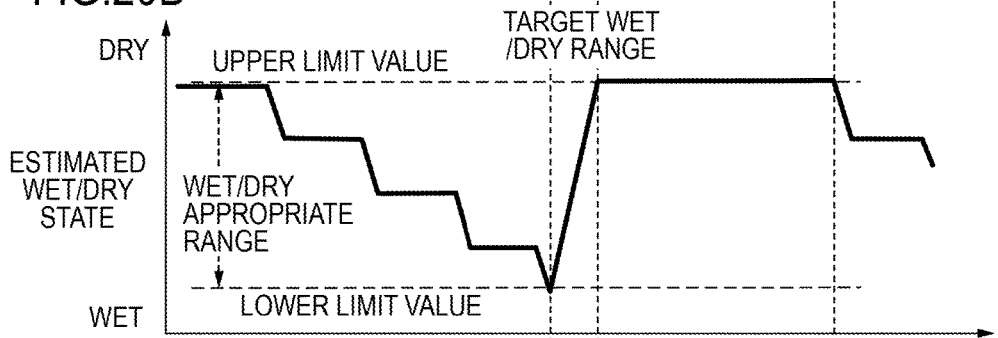
Figure 20E:
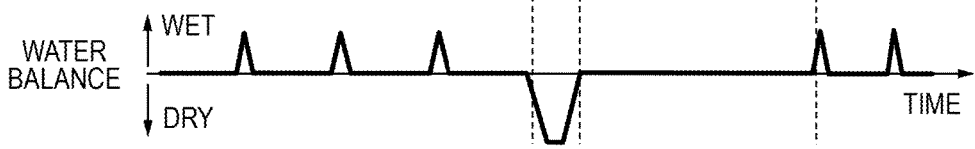

In the time charts of FIG. 20, the controller 201 calculates the water balance of the fuel cell stack 1 (see FIG. 20E) and determines the flow rate of the cathode gas to be supplied to the fuel cell stack 1 and the reset upper limit value of the output voltage on the basis of the calculated water balance (Steps S32, S402) when the wet/dry state of the fuel cell stack 1 estimated by the wet/dry state detection unit 210 reaches the lower limit value of the wet/dry appropriate range (see FIG. 20D).

The cathode gas supply control unit 280 drives the compressor 22 on the basis of the determined supply flow rate to supply the cathode gas to the fuel cell stack 1. Since the output voltage of the fuel cell stack 1 reaches the reset upper limit value in this way (see FIG. 20A), energy by an excess electrochemical reaction of supplied oxygen and residual hydrogen is extracted as an output current (see FIG. 20B).

When the wet/dry state of the fuel cell stack 1 enters the target wet/dry range or reaches the target degree of wetness, the supply of the cathode gas by the cathode gas supply control unit 280 is stopped (see FIG. 20C). Thereafter, the output voltage gradually decreases to reach the lower limit value. Since the output current is not extracted during that time, the wet/dry state of the fuel cell stack 1 can be kept in the target wet/dry range (see FIG. 20D).

When the output voltage reaches the lower limit value, the output voltage upper limit value resetting unit 270 returns the upper limit value of the output voltage from the reset upper limit value to the initial upper limit value. At this time, the cathode gas supply control unit 280 intermittently supplies the cathode gas to the fuel cell stack 1. Thus, the output voltage increases to the upper limit value and excess energy is extracted as the output current. Then, the wet/dry state of the fuel cell stack 1 transitions to the wet side by as much as the output current is extracted.

As described above, as against the control method for the fuel cell system 100 in the above second embodiment, a control method for the fuel cell system 100 of the present embodiment further includes a step of calculating the water balance of the fuel cell stack 1 during the idle stop operation, at least the upper limit value of the output voltage of the fuel cell stack 1 is reset to increase in the resetting step and the flow rate of the cathode gas to be supplied is determined on the basis of the reset upper limit value of the output voltage and the cathode gas is intermittently supplied on the basis of the determined cathode gas flow rate and the calculated water balance in the cathode gas supplying step to change the calculated water balance in a drying direction if the detected wet/dry state of the fuel cell stack 1 deviates toward a further wet side than the wet/dry appropriate range. Further, the control method for the fuel cell system 100 of the present embodiment is configured such that the upper limit value of the output voltage of the fuel cell stack 1 is reset to return to the upper limit value before resetting in the resetting step and the flow rate of the cathode gas to be supplied is determined on the basis of the reset upper limit value (initial upper limit value) of the output voltage and the cathode gas is intermittently supplied on the basis of the determined cathode gas flow rate and the calculated water balance in the cathode gas supplying step to change the calculated water balance in a wetting direction if the detected wet/dry state of the fuel cell stack 1 deviates toward a further dry side than the wet/dry appropriate range.

According to the control method for the fuel cell system 100 of the present embodiment, when the estimated wet/dry state reaches the lower limit value of the wet/dry appropriate range, the cathode gas is supplied on the basis of the water balance in the fuel cell stack 1 so that the target wet/dry range is reached at once. Thus, the wet/dry state in the fuel cell stack 1 can be transitioned to the target wet/dry range promptly. In this way, the wet/dry state in the fuel cell stack 1 during the idle stop operation can be quickly made proper. Further, since the upper limit value of the output voltage of the fuel cell stack 1 and the supply amount of the cathode gas are determined on the basis of the water balance in the fuel cell stack 1, the wet/dry state of the fuel cell stack 1 can be accurately made proper. It should be noted that if the wet/dry state of the fuel cell stack 1 deviates toward the further wet side than the wet/dry appropriate range, the lower limit value of the output voltage may also be reset to increase. In this case, if the wet/dry state of the fuel cell stack 1 deviates toward the further dry side than the wet/dry appropriate range, the reset lower limit value of the output voltage may be reset to return to the initial lower limit value.

Sixth Embodiment

A sixth embodiment of the present invention is described mainly on points of difference from the first embodiment below. It should be noted that since an overall configuration of a fuel cell system 100 is substantially similar to that of the first embodiment, the overall configuration of the system is described using FIG. 1 and not described in detail here. Further, in the present embodiment, parts performing functions similar to those of the above first embodiment are denoted by the same reference signs and repeated description is omitted as appropriate.

In the above first to fifth embodiments, when the wet/dry state of the fuel cell stack 1 reaches the lower limit value of the wet/dry appropriate range, the controller 200 or 201 resets to increase the upper limit value of the output voltage of the fuel cell stack 1 and executes such a control that the wet/dry state reaches the target wet/dry range. The present embodiment differs from the first to fifth embodiments in that a wet/dry state of a fuel cell stack 1 reaches a target wet/dry range by increasing at least one of a supply amount and a supply time of cathode gas without increasing an upper limit value of an output voltage of the fuel cell stack 1 also under such circumstances.

It should be noted that functions of a controller 200 of the present embodiment are similar to those of the controller 200 of the first embodiment except for the points that the output voltage upper limit value resetting unit 270 is omitted and a determination result of a wet/dry appropriate range determination unit 260 is directly output to a cathode gas supply control unit 280. Thus, in the following description, the operation of the fuel cell system 100 of the present embodiment is described using the functional block diagram of FIG. 3.

First, the operation of the fuel cell system 100 of the present embodiment is described using a flow chart shown in FIG. 21. FIG. 21 is a flow chart showing an example of an idle stop operation process executed by the controller 200 in the sixth embodiment of the present embodiment. The controller 200 executes this idle stop operation process if it is determined in Step S1 of the idle stop determination process shown in FIG. 7 that an idle stop start condition has been satisfied.

In this idle stop operation process, the cathode gas supply control unit 280 of the controller 200 first stops a compressor 22 to start the supply of cathode gas (Step S11). Then, an output voltage upper/lower limit value setting unit 230 sets upper and lower limit values of the output voltage of the fuel cell stack 1 during the idle stop operation (Step S12).

Subsequently, a wet/dry appropriate range setting unit 240 sets a wet/dry appropriate range (upper and lower limit values thereof) of the fuel cell stack 1 and sets a target wet/dry range during the idle stop operation process (Step S41) and a wet/dry state detection unit 210 estimates the wet/dry state of the fuel cell stack 1 (Step S42).

Subsequently, the wet/dry appropriate range determination unit 260 determines whether or not the estimated wet/dry state has dropped to or below the lower limit value (i.e. limit value on a wet side) of the wet/dry appropriate range (Step S43). If it is determined that the estimated wet/dry state has dropped to or below the lower limit value of the wet/dry appropriate range, the controller 200 proceeds to Step S21 of the process flow.

In this case, the controller 200 (may be performed by the wet/dry appropriate range determination unit 260) compares the current wet/dry state estimated by the wet/dry state detection unit 210 and the target wet/dry range set in Step S41 and calculates a deviation between the current wet/dry state and the target wet/dry range (Step S21).

Then, the controller 200 determines a flow rate of the cathode gas to be supplied to the fuel cell stack 1 on the basis of the calculated deviation (Step S44). The cathode gas supply control unit 280 drives the compressor 22 to supply the cathode gas to the fuel cell stack 1 on the basis of the determined cathode gas flow rate (Step S45).

Subsequently, the wet/dry appropriate range determination unit 260 determines whether or not the wet/dry state estimated by the wet/dry state detection unit 210 has reached the target wet/dry range (Step S23). Until the estimated wet/dry state reaches the target wet/dry range, the cathode gas supply control unit 280 continues the supply of the cathode gas to the fuel cell stack 1. If it is determined that the estimated wet/dry state has reached the target wet/dry range, the cathode gas supply control unit 280 stops the compressor 22 to stop the supply of the cathode gas to the fuel cell stack 1 (Step S46) and ends this idle stop operation process.

On the other hand, if the estimated wet/dry state is determined to be larger than the wet/dry appropriate range in Step S43, the output voltage determination unit 250 determines whether or not the output voltage of the fuel cell stack 1 detected by a voltage sensor 52 has dropped to or below the lower limit value set in Step S12 (Step S14). If the output voltage is determined to be larger than the lower limit value, the controller 200 directly ends this idle stop operation process.

If the output voltage is determined to have dropped to or below the lower limit value, the cathode gas supply control unit 280 drives the compressor 22 to supply the cathode gas to the fuel cell stack 1 (Step S15).

Subsequently, the output voltage determination unit 250 determines whether or not the output voltage of the fuel cell stack 1 detected by the voltage sensor 52 has increased to or above the upper limit value set in Step S12 (Step S16). If the output voltage is determined to be below the upper limit value, the controller 200 waits in this Step S16 until the output voltage increases to or above the upper limit value.

On the other hand, if the output voltage is determined to be equal to or above any one of the set upper limit values, the cathode gas supply control unit 280 stops the compressor 22 to stop the supply of the cathode gas to the fuel cell stack 1 (Step S17) and ends this idle stop operation process.

An example of the operation of the fuel cell system 100 in the present embodiment is described below using time charts of FIG. 22. FIG. 22 are time charts showing a state change of each physical quantity during the idle stop operation in the sixth embodiment of the present invention. In this example, a case is described where the target wet/dry state range is reached promptly by suddenly supplying the cathode gas to the fuel cell stack 1 without resetting the upper limit value of the output voltage after the wet/dry state reaches the target wet/dry range. It should be noted that state changes similar to those in the time charts of FIG. 6 in the first embodiment may be omitted.

Figure 22A:
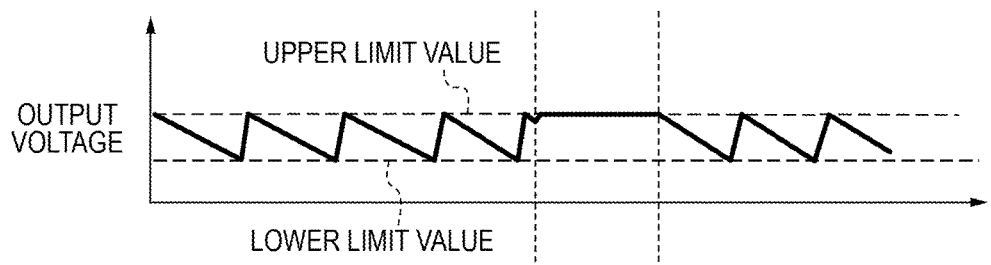
Figure 22B:
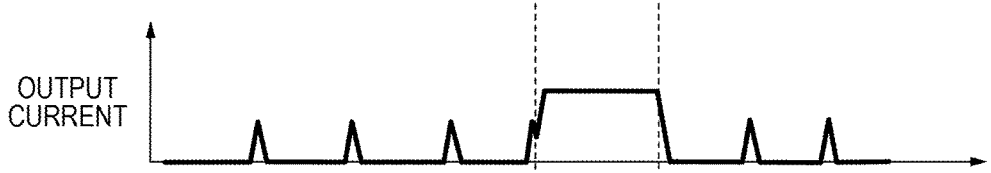
Figure 22C:
Figure 22D:
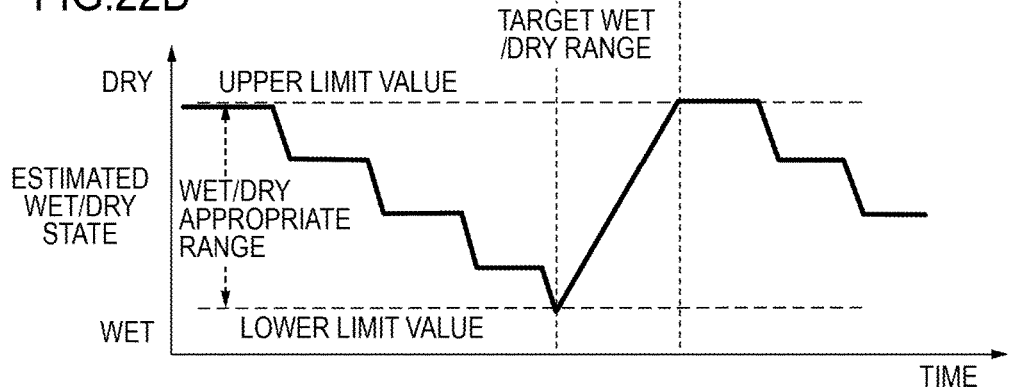

In this example, when the wet/dry state of the fuel cell stack 1 estimated by the wet/dry state detection unit 210 reaches the lower limit value of the wet/dry appropriate range (see FIG. 22D), the cathode gas supply control unit 280 continuously supplies the cathode gas to the fuel cell stack 1 on the basis of the supply flow rate of the cathode gas set from the deviation between the current wet/dry state and the target wet/dry range (see FIG. 22C).

Here, since resetting is not performed to increase the upper limit value of the output voltage by the output voltage upper limit value resetting unit 270 in this example, a certain output current is extracted by the supply of the cathode gas and water is reasonably generated according to that. However, since the supply flow rate of the cathode gas is reasonably large, a sufficient amount of generated water is discharged from the fuel cell stack 1. As just described, in this example, it takes a somewhat longer time to dry the inside of the fuel cell stack 1 as compared to the fifth embodiment.

When the estimated wet/dry state reaches the target wet/dry range, the cathode gas supply control unit 280 stops the supply of the cathode gas to the fuel cell stack 1, whereby the generation of water is also stopped. Thus, the output voltage of the fuel cell stack 1 gradually decreases and reaches the lower limit value of the output voltage in the same manner as during a normal idle stop operation.

In the succeeding control, the cathode gas supply control unit 280 intermittently supplies the cathode gas to the fuel cell stack 1 in the same manner as during the normal idle stop operation. In the present embodiment, the controller 200 executes such a control during the idle stop operation to control the wet/dry state in the fuel cell stack 1.

As described above, a control method for the fuel cell system 100 of the present embodiment further includes a step of setting the target degree of wetness or target wet/dry range of the fuel cell stack 1 during the idle stop operation and configured such that the upper limit value of the output voltage of the fuel cell stack 1 is not reset to increase in the resetting step and at least one of the flow rate and the supply time of the cathode gas to be supplied is determined on the basis of the detected wet/dry state of the fuel cell stack 1 and the set target degree of wetness or target wet/dry range and the cathode gas is intermittently supplied on the basis of the determined cathode gas flow rate and supply time in the cathode gas supplying step even if the detected wet/dry state of the fuel cell stack 1 is determined to be outside the wet/dry appropriate range.

According to the control method for the fuel cell system 100 of the present embodiment, the upper limit value of the output voltage is not reset to increase even if the wet/dry state reaches the lower limit value of the wet/dry appropriate range unlike the first to fifth embodiments. Thus, it can be suppressed that an electrolyte membrane of each fuel cell in the fuel cell stack 1 is exposed to high potential. In this way, an advance of deterioration due to high potential of the electrolyte membranes can be suppressed, performance degradation of the fuel cell stack 1 can be suppressed and the lift of the fuel cell stack 1 can be extended.

It should be noted that only the supply flow rate of the cathode gas is set in the time charts shown in FIG. 21 and the time charts shown in FIG. 22. However, in the present invention, the supply time may be also determined and the cathode gas supply control unit 280 may supply the cathode gas to the fuel cell stack 1 according to the supply flow rate and the supply time as in the fifth embodiment. Alternatively, only the supply time of the cathode gas may be determined and the cathode gas supply control unit 280 may supply the cathode gas to the fuel cell stack 1 according to the supply time.

Although the embodiments of the present invention have been described above, the above embodiments are merely an illustration of some application examples of the present invention and not intended to limit the technical scope of the present invention to the specific configurations of the above embodiments.

In each of the above embodiments, a case has been described where the wet/dry state of the fuel cell stack 1 (wet/dry state of the electrolyte membranes of the fuel cells) is used to set a control timing of drying the inside of the fuel cell stack 1 by resetting the upper limit value of the output voltage of the fuel cell stack 1 or supplying more cathode gas during the idle stop operation. However, in the present invention, a control target is not limited to the wet/dry state of the fuel cell stack 1 and the measured HFR before the estimation of the wet/dry state may be used. In this case, each block of FIGS. 3 and 10 may detect, obtain or set information (data) relating to the HFR of the fuel cell stack 1 or determine on the basis of those pieces of information.

Further, in each of the above embodiments, a case has been described where various controls are executed using the upper and lower limit values of the output voltage of the fuel cell stack 1. However, in the present invention, an output voltage of a predetermined number of the fuel cells in the fuel cell stack 1, an average value of the inter-terminal voltages of the fuel cells or the like may be used.

Furthermore, a case where the output voltage upper limit value resetting unit 270 resets to increase the upper limit value of the output voltage of the fuel cell stack 1 under the predetermined condition has been described in the above first to fifth embodiments. However, without limitation to such a control, the present invention may be configured to reset the upper and lower limit values (i.e. variation range (band)) or an intermediate value of the output voltage.

Further, although a case where the wet/dry state detection unit is divided into the impedance measuring device 6 serving as a detection unit and the wet/dry state detection unit 210 of the controller 200 for processing a measurement signal of the impedance measuring device 6 has been described in each of the above embodiments, the present invention is not limited to such a configuration. For example, these functions can be integrally configured. Further, although a case where the cathode gas is supplied to the fuel cell stack 1 by the compressor 22 serving as an actuator of an interface and the cathode gas supply control unit 280 incorporated into the controller 200 has been described in each of the above embodiments, the present invention is not limited to such a configuration. For example, these functions can also be integrally configured similar to the above.

Further, as described in each of the above embodiments, the controller 200 is configured by the microcomputer and at least integrally controls the wet/dry state detection unit 210, the output voltage upper/lower limit value setting unit 230, the wet/dry appropriate range setting unit 240, the output voltage determination unit 250, the wet/dry appropriate range determination unit 260, the output voltage upper limit value resetting unit 270 and the cathode gas supply control unit 280. If the wet/dry state of the fuel cell stack 1 deviates from the wet/dry appropriate range set by the wet/dry appropriate range setting unit 240 during the idle stop operation, the output voltage upper limit value resetting unit 270, of course, resets the output voltage (upper limit value, lower limit value, output range, etc.) of the fuel cell stack 1, controls the cathode gas supplying/discharging device 2 to intermittently supply the cathode gas with the output voltage set at a value between the upper limit value and the lower limit value of the reset output voltage and also executes a control during the normal operation other than the idle stop operation.

This application claims a priority based on the patent application, JP2015-241430, filed with the Japanese Patent Office on Dec. 10, 2015, the entire contents of which application is incorporated herein by reference.

The invention claimed is:

1. A control method for a fuel cell system configured to execute an idle stop operation to selectively stop power generation of a fuel cell according to a required output of a load and intermittently supply cathode gas to the fuel cell during an operation stop, comprising the steps of:
   setting an upper limit value and a lower limit value of an output voltage of the fuel cell during the idle stop operation;
   intermittently supplying the cathode gas with the output voltage of the fuel cell set at a value between the upper limit value and the lower limit value;
   detecting a wet/dry state of the fuel cell;
   setting a wet/dry range for the wet/dry state of the fuel cell during the idle stop operation;
   determining whether or not the detected wet/dry state of the fuel cell is within the set wet/dry range; and
   resetting at least one of the upper limit value or the lower limit value of the output voltage of the fuel cell if the detected wet/dry state of the fuel cell is determined to be outside the set wet/dry range;
   wherein the cathode gas is intermittently supplied with the output voltage of the fuel cell set at a value between the upper limit value and the lower limit value of the output voltage after the resetting, in the cathode gas supplying step, if the output voltage of the fuel cell is reset.

2. The control method for a fuel cell system according to claim 1, wherein:
   the upper limit value of the output voltage of the fuel cell is reset to increase, in the resetting step, if the detected wet/dry state of the fuel cell is determined to be outside the set wet/dry range.

3. The control method for a fuel cell system according to claim 1, further comprising the steps of:
   setting a target wet/dry degree or target wet/dry range of the fuel cell during the idle stop operation; and
   returning a reset upper limit value and lower limit value of the output voltage of the fuel cell to the upper limit value and the lower limit value before the resetting on a basis of the detected wet/dry state of the fuel cell and the set target wet/dry degree or target wet/dry range.

4. The control method for a fuel cell system according to claim 3, wherein:
the reset upper limit value of the output voltage of the fuel cell is returned to the upper limit value before the resetting after the output voltage of the fuel cell drops to or below the upper limit value of the output voltage before the resetting, in the setting returning step, if the detected wet/dry state of the fuel cell reaches the set target wet/dry degree or target wet/dry range.

5. The control method for a fuel cell system according to claim 3, wherein:
a flow rate and a supply time of the cathode gas to be supplied are determined on the basis of the detected wet/dry state of the fuel cell and the set target wet/dry degree or target wet/dry range and the cathode gas is intermittently supplied on a basis of the determined cathode gas flow rate and supply time, in the cathode gas supplying step, if the cathode gas is intermittently supplied with the output voltage set at a value between the reset upper limit value and lower limit value of the output voltage.

6. The control method for a fuel cell system according to claim 1, further comprising a step of calculating a water balance of the fuel cell during the idle stop operation, wherein:
at least the upper limit value of the output voltage of the fuel cell is reset to increase in the resetting step, and a flow rate of the cathode gas to be supplied is determined on a basis of a reset upper limit value of the output voltage and the cathode gas is intermittently supplied on a basis of the determined cathode gas flow rate and the calculated water balance in the cathode gas supplying step, such that a calculated water balance is changed in a drying direction, if the detected wet/dry state of the fuel cell deviates toward a further wet side than the wet/dry range; and
the upper limit value of the output voltage of the fuel cell is reset to return to the upper limit value before the resetting in the resetting step, and the flow rate of the cathode gas to be supplied is determined on the basis of the reset upper limit value of the output voltage and the cathode gas is intermittently supplied on the basis of the determined cathode gas flow rate and the calculated water balance in the cathode gas supplying step, such that the calculated water balance is changed in a wetting direction, if the detected wet/dry state of the fuel cell deviates toward a further dry side than the wet/dry range.

7. The control method for a fuel cell system according to claim 1, further comprising a step of setting a target wet/dry degree or target wet/dry range of the fuel cell during the idle stop operation, wherein:
the upper limit value of the output voltage of the fuel cell is not reset to increase in the resetting step, and at least one of a flow rate or a supply time of the cathode gas to be supplied is determined on a basis of the detected wet/dry state of the fuel cell and the set target wet/dry degree or target wet/dry range and the cathode gas is intermittently supplied on a basis of the determined cathode gas flow rate and supply time, in the cathode gas supplying step, even if the detected wet/dry state of the fuel cell is determined to be outside the wet/dry range.

8. The control method for a fuel cell system according to claim 1, wherein:
a reset upper limit value of the output voltage is higher than an open circuit voltage of the fuel cell.

9. The control method for a fuel cell system according to claim 1, wherein:
the wet/dry range is set to a range of a wet/dry state in which an electrolyte membrane of the fuel cell does not become excessively wet or excessively dry during the idle stop operation.

10. A fuel cell system configured to execute an idle stop operation to selectively stop power generation of a fuel cell according to a required output of a load and intermittently supply cathode gas from a cathode gas supplying device to the fuel cell during an operation stop, comprising:
a wet/dry state detection unit configured to detect a wet/dry state of the fuel cell;
an output voltage upper/lower limit value setting unit configured to set an upper limit value and a lower limit value of an output voltage of the fuel cell during the idle stop operation;
a wet/dry range setting unit configured to set a wet/dry range for the wet/dry state of the fuel cell during the idle stop operation is appropriate;
a wet/dry range determination unit configured to determine whether or not the wet/dry state of the fuel cell detected by the wet/dry state detection unit is within the wet/dry range set by the wet/dry range setting unit;
an output voltage resetting unit configured to reset at least one of the upper limit value or the lower limit value of the output voltage of the fuel cell if the detected wet/dry state of the fuel cell is determined to be outside the set wet/dry range by the wet/dry range determination unit; and
a control unit configured to intermittently supply the cathode gas from the cathode gas supplying device with the output voltage of the fuel cell set at a value between the upper limit value and the lower limit value of the output voltage after the resetting if the output voltage resetting unit resets the output voltage of the fuel cell.

11. The fuel cell system according to claim 10, wherein:
the output voltage resetting unit resets to increase the set upper limit value of the output voltage of the fuel cell if the detected wet/dry state of the fuel cell is determined to be outside the set wet/dry range by the wet/dry range determination unit.

12. The fuel cell system according to claim 11, further comprising a target wet/dry degree setting unit configured to set a target wet/dry degree or target wet/dry range of the fuel cell during the idle stop operation, wherein:
the output voltage resetting unit returns a reset upper limit value of the output voltage of the fuel cell to the upper limit value before the resetting on a basis of the wet/dry state of the fuel cell detected by the wet/dry state detection unit and the target wet/dry degree or target wet/dry range set by the target wet/dry degree setting unit.

13. The fuel cell system according to claim 11, wherein:
the upper limit value of the output voltage reset by the output voltage resetting unit is higher than an open circuit voltage of the fuel cell.

14. The fuel cell system according to claim 10, wherein:
the wet/dry range setting unit is configured to set the wet/dry range to a range of a wet/dry state in which an electrolyte membrane of the fuel cell does not become excessively wet or excessively dry during the idle stop operation.

15. A fuel cell system configured to execute an idle stop operation to selectively stop power generation of a fuel cell according to a required output of a load and intermittently supply cathode gas from a cathode gas supply to the fuel cell during an operation stop, comprising:
- a wet/dry state detector configured to detect a wet/dry state of the fuel cell; and
- a controller programmed to:
    - set an upper limit value and a lower limit value of an output voltage of the fuel cell during the idle stop operation;
    - set a wet/dry range for the wet/dry state of the fuel cell during the idle stop operation;
    - determine whether or not the wet/dry state of the fuel cell detected by the wet/dry state detector is within the wet/dry range;
    - reset at least one of the upper limit value or the lower limit value of the output voltage of the fuel cell if the detected wet/dry state of the fuel cell is determined to be outside the wet/dry range; and
    - intermittently supply the cathode gas from the cathode gas supply with the output voltage of the fuel cell set at a value between the upper limit value and the lower limit value of the output voltage after the resetting if the output voltage of the fuel cell is reset.

* * * * *